United States Patent [19]

Paulson et al.

[11] Patent Number: 4,623,988

[45] Date of Patent: Nov. 18, 1986

[54] APPARATUS FOR MONITORING AND DISPLAYING ACTIVITY OF AN INFORMATION PROCESSING SYSTEM

[75] Inventors: Robert T. Paulson, Trumbull, Conn.; Gary S. Sevitsky, Bayside, N.Y.; Nicholas A. D'Agosto, III, Trumbull, Conn.

[73] Assignee: Dictaphone Corporation, Rye, N.Y.

[21] Appl. No.: 496,654

[22] Filed: May 20, 1983

[51] Int. Cl.⁴ .................................. H04M 11/10
[52] U.S. Cl. ............................ 364/900; 369/29
[58] Field of Search .............. 179/6.09, 6.17; 369/25, 369/28-29, 53; 364/200 MS File, 900 MS File

[56] References Cited

U.S. PATENT DOCUMENTS

| | | | |
|---|---|---|---|
| 3,648,249 | 3/1972 | Goldsberry | 364/900 |
| 3,839,600 | 10/1974 | Matz | 369/29 X |
| 3,904,836 | 9/1975 | Mohammadioun | 369/29 X |
| 3,984,644 | 10/1976 | Matz | 369/29 |
| 4,024,354 | 5/1977 | Bolick | 369/29 |
| 4,221,938 | 9/1980 | Mohammadioun et al. | 179/6.09 X |
| 4,260,854 | 8/1981 | Kolodny et al. | 369/29 X |
| 4,303,998 | 12/1981 | Plunkett, Jr. | 369/29 |
| 4,319,337 | 3/1982 | Sander et al. | 364/900 |
| 4,399,527 | 8/1983 | Titus, IV et al. | 369/29 X |

Primary Examiner—James D. Thomas
Assistant Examiner—David L. Clark
Attorney, Agent, or Firm—Curtis, Morris & Safford

[57] ABSTRACT

Apparatus for monitoring and displaying the activity of an information processing system, such as a central dictation system, having plural recorders, plural originating stations for supplying information jobs to be recorded on the recorders, and recovery stations for recovering information jobs from those recorders. The activity which is monitored and displayed includes the availability of respective recorders to receive information from originating stations, the lengths of information jobs which have been recorded and now await recovery, the expected recovery delay in recovering a new information job to be recorded on a recorder, and the number of information jobs in each recorder that are awaiting recovery. The apparatus includes a processor which senses the aforementioned activity and controls a video display for displaying same.

41 Claims, 12 Drawing Figures

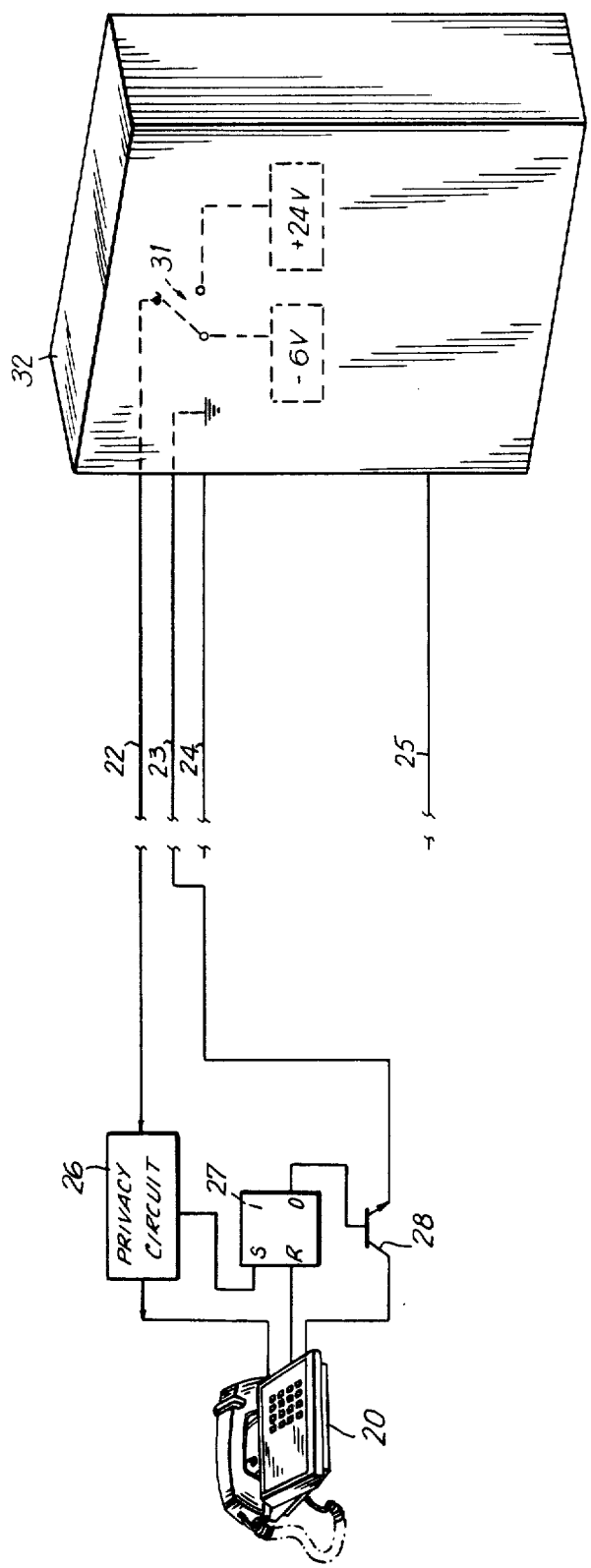

FIG. 3A

S-8% A-5% BACKLOG = 201   TURNAROUND = 0.2   RATE = 800      OCT 83  28/08:07

RECORDER STATUS

ALERT: CASS 4003 R# 06

| R# LL | STATUS | ITEM | PERCENT FULL | TR | CALLS | TIME | TAT | LENGTH | JOBS |
|---|---|---|---|---|---|---|---|---|---|
| 1 AP | READY | 1 ■ | | 2 | | | 1.9 | 198 | 33 |
| 2 A | READY | 99 | | 1 | | | 0.1 | 18 | 3 |
| 3 A | READY | 1 | | 3 | | | 0.3 | 36 | 5 |
| 4 A | IN USE | 1 | | 4 | | | 0.1 | 12 | 2 |
| 5 A | READY | 4001 | < | | 0-5 | 0- | | 0 | 0 |
| 6 A | READY | 4003 ■■■ | | | 10- | 10- | | 0 | 0 |

WORD TANK TOTALS        0.6     264     43

FIG. 3B

S-8% A-5% BACKLOG = 201   TURNAROUND = 0.2   RATE = 800      OCT 83  28/08:08

RECORDER STATUS   PRIORITY

ALERT: CASS 4003 R# 06

| R# LL | STATUS | ITEM | PERCENT FULL | TR | CALLS | TIME | TAT | LENGTH | JOBS |
|---|---|---|---|---|---|---|---|---|---|
| 1 AP | READY | ■ | | | | | 1.9 | 198 | 33 |
| 2 A | READY | | | | | | 0.0 | 0 | 0 |
| 3 A | READY | 2 | | 5 | | | 0.0 | 6 | 1 |
| 4 A | IN USE | | | | | | 0.0 | 0 | 0 |
| 5 A | READY | 4001 | < | | 0-5 | 0 | | 0 | 0 |
| 6 A | READY | 4003 ■■■ | | | 10- | 10- | | 0 | 0 |

WORD TANK TOTALS        0.5     204     34

APPARATUS FOR MONITORING AND DISPLAYING ACTIVITY OF AN INFORMATION PROCESSING SYSTEM

BACKGROUND OF THE INVENTION

This invention relates to apparatus for monitoring and displaying the activity of an information processing system and, more particularly, to such apparatus which monitors and displays selected parameters of a central information recording system, such as a central dictation system.

This invention is related to and is an improvement of the system disclosed and claimed in U.S. Pat. No. 4,319,337, issued to the assignee of the present invention.

In a central information processing system, information generally originates from several originating stations, such as dictate stations or terminals normally included in a central dictation system. This information is transmitted to and processed by individual processing devices, such as message recorders in a central dictation system, for further use. Recovery stations, or terminals, connectable to the individual processing devices, serve to recover the information therefrom. In the central dictation environment, such recovery stations are transcribe devices which are connectable to the recorders to transcribe previously recorded messages.

Various types of recorders which can be used in a central dictation system are noted in aforementioned U.S. Pat. No. 4,319,337. As also mentioned therein, it is desirable, both in a central dictation system and, more generally, in a centralized information processing system, to provide some means by which information jobs, such as dictated messages, may be monitored at least until such jobs ultimately are recovered, or transcribed. This patent describes a system for monitoring and displaying the status of individual information jobs, such as dictated messages, as each such job is generated and processed.

The information job status monitoring and displaying system described in the aforementioned patent "tracks" each job, or message, to display various status data associated therewith. For example, the identity of the originator, or dictator, of the job is displayed, together with the identity of the particular recorder on which that job or message was recorded. If the job or message is recorded on a magnetic tape cassette, the identity thereof also is indicated and displayed. Furthermore, the length of the job or message and the time at which it was recorded also are displayed. The system further functions to indicate whether a particular job is in the process of being generated, or dictated, whether that job is ready to be recovered, or transcribed, whether that job is in the process of being recovered or transcribed (e.g. whether it has been "assigned" to a particular recovery or transcribe station), and whether the recovery or transcription of that job has been completed. As the status of a particular job or message changes, such as when that job or message changes from condition "ready" to be recovered or transcribed to the process of being recovered or transcribed, to the completion of the recovery or transcription thereof, such changes in status are displayed. Thus, a supervisory operator may accurately track, or follow, respective jobs as they are processed in the central processing system. Moreover, in the event of an inquiry regarding a particular job, such as its present status, or when recovery thereof can be expected, or when or who originated or recovered it, the supervisory operator may easily and rapidly recall all information associated with that inquiry.

While the monitoring and displaying system of the aforementioned patent operates satisfactorily, it is desirable, in some applications, to obtain and display information that relates to the overall operation and efficiency of the information processing system. For example, it is desirable to provide a display of the status of individual recorders which are included in the system so as to indicate the availability of each such recorder for use in recording information or messages, the overall delay in recovering a new message that may be recorded on each recorder, the lengths of messages which are recorded and the number of messages which are awaiting recovery. Also, it is desirable to display the identity (e.g. number) of a message which is in position to be recovered or transcribed. Still further, it is desirable to provide a graphical display of that portion of the recording capacity of a particular recorder which is consumed by messages awaiting recovery. Furthermore, if the information processing system with which the monitoring and display apparatus is used exhibits the capability of recording "priority" messages (i.e. messages which must be recovered quickly before the recovery of other messages), it is desirable to provide a separate display of the status of "priority" recorders (i.e. those recorders on which the priority messages are recorded), as well as those messages which are to be transcribed on a "priority" basis.

Much of the aforementioned information is collected and monitored in the monitoring and displaying apparatus described in U.S. Pat. No. 4,319,337. However, the overall status of the individual recorders included in the information processing system is not displayed therein. Hence, the overall operation and efficiency of the information processing system is not easily ascertainable; and a supervisory operator may be at a disadvantage in supervising the overall recording and recovery of messages.

In addition, it is possible that, in a centralized information processing system, such as a central dictation system, an originating, or dictate, station may remain operably connected to a recorder yet be disposed in its ina2ctive or idle mode. For example, a dictate station may "seize" a recorder for the purpose of recording a message thereon. At the completion of recording the message, the dictator may return his dictate station to an "on-hook" condition by which the seized recorder is released. However, if the dictate station is not placed properly in its "on-hook" mode, such as if the usual handset of the dictate station is not properly returned to its cradle, the recorder is not released. In prior systems, this failure to release the recorder results in locking out other dictate stations from connecting thereto, thus reducing the overall availability and efficiency of the central system. It is desirable, in the foregoing situation, to provide the supervisory operator of the monitoring and displaying apparatus with the capability of disconnecting an inactive dictate station from a recorder, thereby making that recorder available to other dictate stations. Furthermore, it is a desired feature to provide an electronic disconnect operation to permit the supervisory operator to control the release of a recorder from a central location, without requiring the operator or an assistant to return the handset of the dictate station physically to its "on-hook" condition.

OBJECTS OF THE INVENTION

Accordingly, it is an object of the present invention to provide improved apparatus for monitoring and displaying information jobs, such as messages, which are recorded on various recorders in an information processing system.

Another object of this invention is to provide monitoring and displaying apparatus related to that described in U.S. Pat. No. 4,319,337, which operates to monitor and display information regarding the status of various recorders included in a central information recording system.

A further object of this invention is to provide improved recorder status display apparatus for displaying the status of individual recorders included in a central dictation system.

An additional object of this invention is to provide monitoring and displaying apparatus which functions to display to a supervisory operator the overall operation and efficiency of a central information processing system, such as a central dictation system.

Yet another object of this invention is to provide display apparatus for selectively displaying either the status of all recorders included in a central dictation system or, alternatively, those recorders which are used for the recording and/or transcription of "priority" messages; the displayed status comprising information relating to the avai2lability of such recorders to record messages, the identity of the particular message which is in position to be transcribed, the length and number of messages awaiting transcription, and the overall delay in transcribing newly recorded messages.

Still another object of this invention is to provide apparatus for use in a central dictation system, wherein the seizure of a recorder by an inactive dictate station is sensed, and the release of that recorder is effected remotely so as to free that recorder for use by other stations.

Another object of this invention is to provide display apparatus of the aforementioned type wherein an inactive dictate station is remotely and electronically disconnected from a recorder by means of the operation of a keyboard by a supervisory operator.

Various other objects, advantages and features of the present invention will become readily apparent from the ensuing detailed description, and the novel features will be particularly pointed out in the appended claims.

SUMMARY OF THE INVENTION

In accordance with this invention, apparatus is provided for use in an information processing system, such as a central dictation system, having plural recorders for recording information jobs, or messages, supplied thereto from originating stations, such as dictate stations, these jobs or messages being recovered, or transcribed, subsequently. The apparatus includes a processor and a display for displaying status-related data of the respective recorders. For example, the availability of a recorder to receive information, or messages, from an originating station is displayed. Also displayed are the lengths of information jobs, or messages, which are recorded on respective recorders, the delay time in recovering a newly-recorded job, or message, from the recorder, a count representing the number of jobs, or messages, which are awaiting recovery from a recorder, and the identity, or number, of the latest job or message which has been recorded. In a preferred embodiment, the status-related data is displayed on a video display screen in the form of alphanumeric characters.

In accordance with one aspect, the availability of a particular recorder is determined by the processor on the basis of predetermined criteria, such as whether all of the recorders in the system are available, on a randomly selectable basis, for receiving messages, or whether recorders in a set are made available in a predetermined sequence, or whether the recorder having the least expected recovery delay is made available.

In accordance with another aspect of this invention, a graphical display, such as a bar graph, is provided to indicate that portion of the recording capacity of a recorder which has been consumed by information, or messages, awaiting recovery.

It is a further aspect of this invention to determine the recovery delay time as a function of the length, or backlog, of information, or messages, awaiting recovery and the rate at which information, or messages, is recovered from that recorder.

Yet another aspect of this invention is to provide monitor and display apparatus for a central dictation system of the type wherein at least some of the recorders are operable to record "priority" messages. As a feature of this aspect, at least some of the recorders included in the system are endless loop recorders having dictate and transcribe ports, and wherein a dictate port is adapted to be coupled to a transcribe station for the priority transcription of messages recorded in that recorder.

A still further aspect of this invention is to provide monitoring and display apparatus for use in a central dictation system of the type wherein at least one recorder included therein is a changer-recorder of the type having a supply of record media, such as tape cartridges, or cassettes, which are transported to a record station and then, following recording thereon, are removed or ejected therefrom. As one feature of this aspect, the recorder-changer includes settable means for establishing a preset overall tape length for recording messages, beyond which length the cartridge or cassette is ejected. The display operates to indicate both this preset length and the actual length of tape which has been consumed by messages. As another feature of this aspect of the invention, the changer-recorder includes settable means for establishing a preset number of seizure connections before the tape cartridge is ejected. The display provides an indication of both the preset number of seizures and the actual number which have been made for recording on the tape cartridge. As an additional feature of this aspect of the invention, the changer-recorder includes settable means for establishing a preset time duration from an initial seizure until the tape cartridge is ejected. The display provides an indication of both the preset time duration and the actual duration of time that has passed since the initial seizure for recording on the cartridge.

As yet another aspect of this invention, cumulative totals of lengths and number of messages recorded on all of the recorders are displayed, as well as the overall recovery delay, or turn-around-time, attending the recovery of a message from the system.

In accordance with a still further aspect of this invention, the seizure of a recorder by an inactive dictate station is detected; and a keyboard is provided for manual operation by a supervisory operator to release that recorder from the inactive dictate station, thereby freeing the recorder for seizure by other dictate stations.

BRIEF DESCRIPTION OF THE DRAWINGS

The following detailed description, given by way of example, will best be understood in conjunction with the accompanying drawings in which:

FIG. 2 is a block diagram of the remote disconnect feature of the present invention;

FIGS. 3A and 3B represent two examples of recorder status and "priority" recorder status displays, respectively;

DETAILED DESCRIPTION OF A CERTAIN PREFERRED EMBODIMENT

The present invention now will be described in the environment of a central dictation system. However, it will be readily appreciated by those of ordinary skill in the art that this invention pertains to information processing systems in general, and particularly of the type having recorders in which information derived from originating stations is recorded and from which the recorded information subsequently may be recovered. In the context of a central dictation system, such originating stations are dictate stations and the recovery stations are best recognized as transcribe stations. The recorders may utilize a movable magnetic medium, such as tape or discs, a dynamic medium, such as bubble memory devices, or conventional static storage means.

Figure 1:
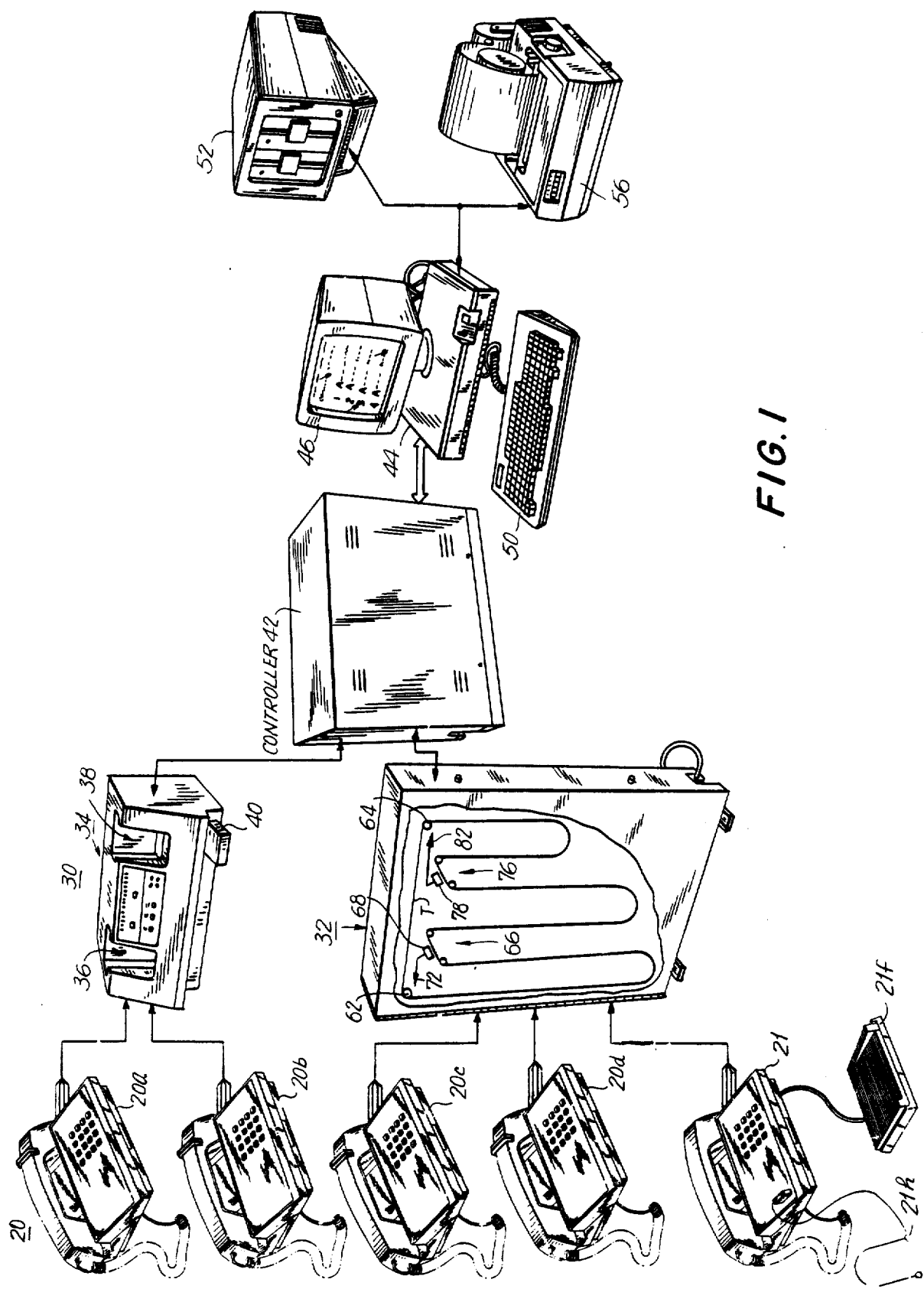
FIG. 1 is a system diagram representing the information processing system with which the monitoring and displaying apparatus of the present invention is used.

Referring to FIG. 1, the central dictation system with which the present invention finds ready application is comprised of a plurality of recorders 30, each being selectively connectable by way of conventional switching circuits (not shown) to any one of several dictate stations 20 to be seized by a dictate station for receiving and recording dictated messages. Preferably, one or more of the recorders may be comprised of an endless-loop recorder 32 of the type described in U.S. Pat. No. 3,817,436. Also included in recorders 30 is one or more recorder-changers 34 which may be of the type described in U.S. Pat. No. 4,092,679. Endless-loop recorder 32 may be coupled by a 4-wire cable to a conventional switching circuit, or matrix (not shown), which, in turn, is connected to the usual 4-wire private-wire connection of each of plural dictate stations 20a, 20b, 20c and 20d. For illustrative purposes only, four dictate stations have been shown. It will be readily appreciated, however, that any desired number of dictate stations, generally many more than four, may be used with the illustrated recorders.

As is known from aforementioned U.S. Pat. No. 3,817,436, endless-loop recorder 32 includes a dictate port 66 and a transcribe port 76. An endless loop of tape T is transported from dictate port 66, whereat dictated messages are recorded thereon, through serpentine folds to transcribe port 76, whereat the previously recorded dictated messages are transcribed. To this effect, a record head 68 is provided at dictate port 66 and a transcribe head 78 is provided at transcribe port 76. As will also be appreciated, each head functions as a conventional magnetic transducer and is capable of recording audio signals on tape T and also of reproducing audio signals from the tape. Head 68 at dictate port 66 is coupled by connection 72 to a suitable audio input/output circuit for recording or reproducing audio signals from the tape. Likewise, head 78 at transcribe port 76 is coupled via connection 82 to a suitable audio input/output circuit.

During normal operation, head 68 of dictate port 66 in endless-loop recorder 32 is coupled at connection 72 to a respective one of dictate stations 20a-20d. Also, head 78 at transcribe port 76 is coupled via connection 82 to a transcribe station, such as transcribe station 21, to permit the transcription of previously recorded dictated messages. Since separate dictate and transcribe ports are provided in recorder 32, it is appreciated that dictation and transcription may proceed simultaneously.

A "priority" message is one which should be transcribed promptly and, thus, has "priority" over other messages that are recorded in the central system. Any individual message recorded on either an endless-loop recorder 32 or recorder-changer 34 may be designated as a "priority" message.

An endless-loop recorder 32 or recorder-changer 34 may function as a "priority" recorder for the recording of "priority" messages exclusively.

To effect "priority" transcription of any message on any endless-loop recorder 32, transcribe station 21 may be connected directly to dictate port 66, thus permitting the transcription of messages immediately without requiring those messages to be transported through the aforementioned serpentine folds to transcribe port 76. Of course, when a transcribe station is connected to dictate port 66, new messages cannot be recorded on tape T of the endless-loop recorder. Recorder 32 produces suitable output signals indicating the connection thereto of a dictate station or a transcribe station, and the particular port to which the transcribe station is connected.

As tape is moved through endless-loop recorder 32, signals analogous to timing signals are generated to indicate the length of tape that is transported past dictate port 66 and also to indicate the length of tape that is transported past transcribe port 76. By accumulating such count signals, a count may be derived representing the length of tape that has been transported past the dictate port, that is, the length of tape consumed by dictated messages, and also the length of tape that has been transported past the transcribe port, that is, the length of transcribed messages. Reference is made to U.S. Pat. No. 3,965,484 for a description of illustrative tape-length sensing apparatus. It is recognized that the difference between these counts represents the overall length of messages that is awaiting transcription.

Recorder 32 functions in the usual manner in response to dictate control signals generated at the dictate station connected thereto to advance tape T, rewind that tape, play back messages from the tape, record messages thereon and generate end-of-message signals. Typically, an end-of-message signal represents the end of a dictated message; and a count of such end-of-message signals represents the number of messages that have been recorded. A similar count of end-of-message signals sensed at transcribe port 76 is indicative of the number of messages that have been transcribed. It is recognized that the difference between these counts represents the number of messages awaiting transcription and, moreover, these respective counts are used, as will be described below, to identify those messages which have been transported to the dictate and/or transcribe ports.

Transcribe station 21 is illustrated in FIG. 1 as including a foot pedal 21f and a headset 21h connected thereto. As is conventional, the operation of foot pedal 21f serves to command the forward and reverse movement of tape T to permit previously recorded messages thereon to be reproduced through headset 21h. Since this feature is conventional and forms no part of the present invention per se, further description of transcribe station 21 and the manner in which the transcribe station cooperates with recorder 32 will not be provided.

Recorder-changer 34 may be of the type described in U.S. Pat. No. 4,092,679. This recorder-changer is coupled to dictate stations 20a–20d in a manner similar to the coupling thereto of endless-loop recorder 32. Recorder 34 is adapted to record messages on individual record media, such as tape cartridges or cassettes. In the preferred embodiment, recorder 34 includes a supply bin 36 in which a stack of fresh magnetic cassettes is stored, an output bin 38 to which cassettes having messages recorded thereon are transported, and a priority eject bin 40 to which cassettes having priority messages recorded thereon are ejected. A record station (not shown) is provided intermediate supply bin 36 and output bin 38. The record station receives a fresh cassette from the supply bin and records messages thereon from the particular dictate station that is connected to recorder-changer 34. When a sufficient number of messages have been recorded, as will be described below, the cassette is removed, or ejected, from the recorder to output bin 38. In the event that the messages recorded on the particular cassette have a high priority of transcription, the cassette is diverted from output bin 38 to priority bin 40. This cassette then may be transcribed promptly.

As is appreciated, in the illustrated embodiment, recorder-changer 34 functions only as a recording device and does not exhibit transcription capabilities. Preferably, after a cassette has been recorded and removed to output bin 38, the cassette is played back by a transcriptionist using a so-called desk-top transcribing machine.

Advantageously, recorder-changer 34 includes a reader of the type which functions to read an optical code that may be disposed on a label provided on the housing of cassettes transported from supply bin 36 to the record station. This optical reading results in a cassette-identifying signal, such as an ID number, which is used to identify the various cassettes upon which messages are recorded. The recorder-changer provides such cassette-identifying signals for use in the monitoring and displaying apparatus, to be described.

Additional signals are provided by the recorder-changer as messages are recorded on a cassette. For example, as the cassette tape is transported, suitable counting means (not shown) generate count signals representing the length of tape consumed by messages. Also, it is contemplated that a particular cassette will receive messages from several dictate stations. A so-called seizure counter is included in recorder-changer 34 to count the number of seizure connections made to the recorder-changer by the various dictate stations. A count representing such seizures also is produced. Still further, the recorder-changer produces timing signals representing the duration of time that has passed since the initial seizure and recording of a message on a fresh cassette.

The recorder-changer also includes manually settable switches by which preset conditions may be established for controlling the subsequent removal or ejection of a cassette from the record station. For example, one of these switches operates to preset a length of tape which, when consumed by messages, results in the removal or ejection of the cassette. Another one of these switches operates to preset the number of seizure connections to recorder-changer 34 for recording messages on a single cassette. Once this preset number of seizures has been made, the cassette is ejected from the record station upon the next release of the recorder by the dictate station. A still further one of these switches operates to preset the time duration from an initial seizure for recording on a fresh cassette until that cassette is ejected. This serves to insure that a message will be transcribed from that cassette even if the cassette remains idle at the record station for a predetermined period of time. At the completion of that period of time, the cassette is ejected and the message may be transcribed.

Signals representing the foregoing preset conditions, as well as the signals representing the actual length of messages recorded on a cassette, the actual number of seizures that have been made to that cassette and the actual duration of time that has passed since an initial seizure to that cassette, are provided by recorder-changer 34.

As mentioned above, recorders 32 and 34 are coupled by means of suitable switching matrixes, which also function as multiplexers, to the various dictate stations included in the system. It is conventional when a recorder is operably connected to one dictate station, to prevent that recorder from being seized or connected to yet another dictate station. That is, "privacy" is insured between a single dictate station and the recorder; and all other dictate stations are effectively "locked-out" from that recorder. Such a privacy connection is provided by a suitable privacy circuit which is described in, for example, U.S. Pat. No. 3,835,261. When considering the 4-wire cable connection between a recorder and a dictate station, one of these wires, generally referred to as the "privacy" line, normally is provided with a voltage level of one type when the recorder is available for seizure; and this voltage level is changed over to a second type when the recorder is seized by a dictate station. The latter voltage level is used to prevent the recorder from being seized while in communication with another dictate station, thus functioning to lock out the recorder from access by other dictate stations. One feature of the present invention, described in greater detail below, functions to release a seized recorder in the event that the recorder is in communication with an inactive dictate station. This frees the "locked-out" recorder, and enables access thereto by other dictate stations. Consequently, inadvertent dictate station "off-hook" conditions can be detected and cured, as will be described below.

Recorders 32 and 34, only two of which are illustrated in FIG. 1, are coupled by, for example, multi-wire cables, to a controller 42 which functions to sense the signals produced by the respective recorders (e.g. the signals representing availability for use, connection of a transcribe station to a dictate or transcribe port, length of recorded messages, length of transcribed messages, length of messages awaiting transcription, number of dictated messages, number of transcribed messages, preset length of recording on a cassette prior to ejection, preset number of seizures to a recorder-changer prior to ejection, actual number of seizures for recording on a cassette, preset time duration from initial seizure to a cassette ejection, actual time duration from an initial seizure, and the like), and also returns control signals to the recorders, for example, to disconnect an inactive dictate station therefrom. Controller 42 is coupled to a processor 44 which operates in response to the aforementioned signals supplied to the controller to establish job records by which data relating to each dictated message is accumulated. Processor 44 cooperates with a display device 46, a keyboard 50 and a magnetic disc-drive mechanism 52 to monitor, store and display the status of various messages which are recorded and transcribed in the central dictation system. In this regard, processor 44, display device 46, keyboard 50 and disc-drive mechanism 52 may be similar to that described in aforementioned U.S. Pat. No. 4,319,337. Processor 44 also cooperates with a printer 56 for the purpose of printing data representing the job records which are assembled and stored by the processor in cooperation with the display, keyboard and disc-drive mechanism. In the interest of brevity, further description of these elements is not provided; and an explanation thereof is found in U.S. Pat. No. 4,319,337, the disclosure of which is incorporated herein by reference.

In one embodiment, controller 42 is adapted to be coupled to up to eight recorders, any number of which may be formed as endless-loop recorders with the remainder, if any, being formed as recorder-changers. Of course, the teachings of the present invention are equally applicable to the connection of controller 42 to a lesser or greater number of recorders.

In operation, recorder 32 may be coupled to any one of several dictate stations 20a-20d and, likewise, recorder-changer 34 also may be coupled to a dictate station. As tape T advances in endless-loop recorder 32, suitable counting apparatus included therein supplies signals to controller 42 representing the length of tape which is advanced past the respective dictate and transcribe ports. Preferably, although not necessarily, controller 42 includes circuitry by which the difference between these counts is obtained, thus representing the amount of tape which awaits transcription. Similarly, recorder-changer 34 supplies count signals to the controller representing the amount of cassette tape which is advanced at the record station.

On completing a message, it is expected that the dictator will operate suitable switches at his dictate station to generate corresponding end-of-message signals. These signals are sensed by controller 42, for example, to increment a message or job counter, thereby representing the number of messages which have been recorded. With respect to endless-loop recorder 32, suitable signals may be supplied from the transcribe port to the controller in response to sensed end-of-message signals to represent the number of messages which have been transcribed. Advantageously, although not necessarily, controller 42 includes suitable circuitry or program-controlled means to obtain the difference between the numbers of messages which have been dictated and transcribed so as to produce a representation of the number of messages awaiting transcription.

Controller 42 supplies to processor 44 the aforementioned signals as well as other signals representing the availability of each of the recorders connected thereto for recording messages. For example, the recorder that is in communication with a dictate station may be identified with an "in-use" signal. A recorder which is ready to be seized by a dictate station may be identified with a "ready" signal. Also, so-called load-leveling circuitry may be used to establish the criteria upon which a recorder is made available for seizure by a dictate station. Such load-leveling circuitry may be included in the switching matrixes between each recorder and dictate stations 20a-20d, or may be generated by controller 42 or, as a further alternative, may be produced by processor 44 in response to manually-entered commands derived from keyboard 50. As an example, all of the recorders coupled to controller 42 may be made available on an equal basis to any dictate station. The dictate stations may be provided with selector switches, each associated with one of these recorders, such that, when operated, the dictate station seizes that recorder, provided the recorder is not, at that time, in communication with another dictate station. As another example, a group (sometimes referred to as a "load-leveling group") of, for example, four recorders may be arranged for sequential seizure by the dictate stations. That is, first recorder #1 is made available for seizure and, when this recorder is so seized, recorder #2 is made available, and then recorder #3, and so on.

Yet another example of the manner in which the recorders coupled to controller 42 may be made available for seizure is based upon the overall delay time in recovering, or transcribing, a message that is recorded thereon. The recorder (for example, in a load-leveling group) having the shortest delay time is made available first. This tends to distribute the overall work load equally among recorders in a load-leveling group. Moreover, it is reasonably assured that a dictated message will be transcribed promptly and will not be subjected to undue delay.

Controller 42 also provides processor 44 with signals representing the number of the message that has been transported to the transcribe port for transcription in each endless-loop recorder 32. If messages are to be transcribed from a recorder on a "priority" basis, the controller supplies processor 44 with signals representing the number of the message which has been transported to the dictate port for transcription. Also, the controller supplies the processor with signals representing the identities of those transcribe stations which are connected to the endless-loop recorders. Such transcriber identifying signals may be generated manually by, for example, the operation of suitable push-buttons by the transcriptionists, or alternatively, such transcriber identifying signals may be generated automatically by the transcribe stations which are connected to the endless-loop recorders.

Display device 46 preferably comprises a video display screen on which alphanumeric characters representing data associated with the status of each recorder, as well as graphic displays and underscoring, are displayed. Alternatively, other display means may be utilized, such as individual display components, for example, fluorescent discharge devices, LCD or LED devices, seven-segment arrays, and the alike. It is preferred, however, to provide a video display screen for display 46 to permit the display of a wide variety of status data associated with each recorder. Examples of such status displays are illustrated in FIGS. 3A and 3B.

Referring first to the display illustrated in FIG. 3A, this depicts the information which is displayed on the display screen comprising display 46. Suitable column headings are provided, these headings being generated automatically in response to the program included in processor 44. The generation of such column headings forms no part of the present invention per se; and it will be understood by those of ordinary skill in the art that suitable instructions may be provided to generate these program headings. As illustrated in FIG. 3A, such program headings include the recorder number (R#), the load-leveling criterion (LL) which is used to determine the availability of a recorder, the status (STATUS) of the recorders (i.e. whether each recorder is ready for use, is in use, is unavailable, or otherwise), the number (ITEM) of the message which is in condition for transcription (for example, from the transcribe port) in endless-loop recorder 32 or, alternatively, the number of the cassette which has been transported from supply bin 36 to the record station of recorder-changer 34, a bargraph display representing that portion of the length of tape which has been consumed by messages, an indication (PERCENT FULL) of the preset length of tape in a recorder-changer which, when consumed, results in the ejection of the cassette, the identity of the transcriptionist (TR) which is coupled to the endless-loop recorder, the number of seizures (CALLS) to a recorder-changer for recording messages on a cassette, and the preset number of seizures which results in ejection of that cassette, the duration of time which has passed (TIME) since the initial seizure of a recorder-changer for recording messages on a fresh cassette, and the preset time duration which, when passed, results in the ejection of the cassette, the turn-around time (TAT), or delay in transcribing a newly-recorded message on an endless-loop recorder, the length of messages (LENGTH) recorded on an endless-loop recorder which await transcription therefrom, and the number of messages (JOBS) which have been recorded on an endless-loop recorder and which await transcription. The manner in which the information associated with each of these column headings is derived and displayed will be described in greater detail below.

FIG. 3A also provides additional information pertaining to the overall operation and efficiency of the central dictation system with which the present invention is used. For example, the uppermost line of this display represents that portion of the capacity of the magnetic disc, known as the "jobs record" disc used in disc-drive mechanism 52, which is consumed with messages awaiting transcription. In the illustrated embodiment, "S-8%" means that 8% of the disc has been filled with job records associated with messages that have not yet been transcribed.

The top line also indicates that portion of the capacity of an archive disc that has been filled with job records. From aforementioned U.S. Pat. No. 4,319,337, it is recognized that an "archive disc" is one that merely stores information relating to job records associated with messages that have been fully transcribed. In the illustrated example, "A-5%" means that 5% of the capacity of the archive disc is filled with job records.

The top line of FIG. 3A also represents the system backlog in terms of tenths of minutes. That is, the representation "BACKLOG=201" means that a total length of messages equal to approximately 20.1 minutes has been recorded in the various recorders included in the central dictation system.

The top line of the illustrated display also indicates the average delay time of the overall central dictation system for transcribing a newly-recorded message. The example of "TURNAROUND=0.2" means that the total delay, from the time that a message is dictated until that message has been transcribed, is equal to 0.2 hours.

The top line of the display illustrated in FIG. 3A also represents the transcription rate of the entire central dictation system. In this example, "RATE=800" is the total transcription rate on the order of about 800 lines per hour. That is, with all transcriptionists operating at their respective rates, the overall central dictation system operates to transcribe, or type, 800 lines of messages each hour.

The top line of the illustrated display also indicates the date and actual time of day.

The next-following line illustrated in FIG. 3A represents the particular type of display which the supervisory operator has selected for observation. In FIG. 3A, this display is referred to as the "recorder status" display, by which the status of each of six recorders connected to controller 42 is indicated. Alternatively, and as shown in FIG. 3B, the supervisory operator may decide to provide a "priority" display, wherein the status of priority recorders, and "normal" recorders on which "priority" messages are recorded, and the recorders from which messages are transcribed on a priority basis, are displayed. Depending upon the status display command effected by the operation of keyboard 50, a corresponding indication of the requested display is provided on the display screen itself.

Display 46 also provides a display of particular alert conditions which apprise the supervisory operator of possible faults in the system. For example, if the identity of the cassette used in a recorder-changer cannot be detected, such as if the label bearing the cassette identifying code is obliterated, the recorder-changer automatically establishes a predetermined identifying number for that cassette. As illustrated in FIG. 3A, the supervisory operator is alerted to this condition, that is, that the identifying number of the cassette which is transported in recorder #6 (a recorder-changer) is not ascertainable and, therefore, the recorder has designated this cassette as cassette #4003. Other alerts are contemplated, such as the connection of an inactive dictate station to a recorder, the occurrence of a fault condition in a recorder, and other similar conditions.

The display screen also provides an alphanumeric indication of the overall activity of, for example, all of the endless-loop recorders that are utilized in the central dictation system. Such endless-loop recorders are referred to as "word tanks" and, as indicated in the lower right portion of the display shown in FIG. 3A, indications are provided of the average recovery time for all of the endless-loop recorders, that is, the expected average delay in transcribing the latest message that is dictated, the total length of all messages recorded on endless-loop recorders, and the total number of such messages.

FIG. 3B illustrates a similar, but "priority", display of the activity of all of the endless-loop recorders which are designated as "priority" recorders (e.g. recorder #1), or are disposed for the priority transcription of messages (e.g. recorder #3), or have "priority" messages recorded thereon. As mentioned above, priority transcription is carried out from the dictate port of the endless-loop recorders. From FIG. 3B, it is seen that recorder #1 is the "priority" recorder on which messages having "priority" status are recorded, and recorder #3 has a transcribe station connected to the dictate port thereof for "priority" transcription.

A more complete description of the information displayed on display screen 46, and the manner in which this information is obtained and displayed in accordance with the present invention, is set out hereinbelow.

Before proceeding with the description of processor 44 and the manner in which this processor controls display 46, reference is made to the schematic diagram shown in FIG. 2. This diagram illustrates, in simplified form, the 4-wire connection between a recorder, such as endless-loop recorder 32, and a typical dictate station 20. For simplicity, the switching matrix which may be provided between the respective dictate stations and the recorders is omitted. Also, it will be appreciated that, even though FIG. 2 illustrates the connection of an endless-loop recorder to the dictate station, the following description is equally applicable to the connection thereto of a recorder-changer.

Conductors 22 and 23 extend between dictate station 20 and recorder 32 to complete a current loop when the dictate station is operably connected to the recorder. Conductors 24 and 25 are used as audio and control signal lines, as described more fully in U.S. Pat. No. 3,835,261. As diagrammatically represented, one of two sources of voltage in the recorder is selectively coupled by a switching circuit 31 to conductor 22 to permit current to flow via this conductor through a privacy circuit 26, through circuitry included in dictate station 20, and then through a switching transistor 28 over conductor 23 to, for example, ground. Privacy circuit 26 may be of the type described in U.S. Pat. No. 3,835,261 which, when current commences to flow therethrough, results in the change-over of switching circuit 31 from the connection to conductor 22 of one source of voltage to the other. The construction and operation of the privacy circuit are fully described in U.S. Pat. No. 3,835,261, which is incorporated herein by reference, and further explanation thereof need not be provided.

Switching transistor 28 is illustrated as an NPN transistor whose base electrode is coupled to an output, for example, the "0" output of a bi-state device 27. This bi-state device is illustrated herein as a set/reset (S/R) flip-flop circuit whose reset input is coupled to dictate station 20 and whose set input is coupled to privacy circuit 26. A reset signal is supplied to flip-flop circuit 27 when dictate station 20 is operated to initiate connection with recorder 32. For example, if the recorder is available for seizure, and dictate station 20 is disposed in its off-hook condition (e.g. the illustrated handset is removed from its cradle), flip-flop circuit 27 is reset to supply a positive biasing voltage to the base electrode of switching transistor 28. It is appreciated that this biasing voltage renders the transistor conductive and current is permitted to flow in the loop from switching circuit 31, via conductor 22, through privacy circuit 26, through dictate station 20, through conductive transistor 28 and via conductor 23 to ground.

As described in aforementioned U.S. Pat. No. 3,835,261, when recorder 32 is available to be seized by a dictate station, switching circuit 31 is coupled to, for example, a source of negative voltage level (e.g. −6 volts); and the application of this voltage level to privacy circuit 26 by conductor 22 permits dictate station 20 to seize the recorder. Once the recorder is seized and current flows through the aforementioned current loop, this current flow conditions switching circuit 31 to change over its connection to the other source of voltage level, for example, a positive voltage level (e.g. +24 volts). This positive voltage level permits current to flow in the loop between conductors 22 and 23; and the seizure of recorder 32 by dictate station 20 is maintained. However, if any other dictate station is attempted to be connected to the recorder, the positive voltage level now supplied to such other dictate station via conductor 22 functions as an inhibit, or lock-out, voltage which prevents any further current loop from being established. That is, the "privacy" between dictate station 20 and recorder 32 is preserved. No other dictate station can seize or be operably connected to the recorder while this recorder is "in use" with dictate station 20. It is not possible for any other dictate station to seize recorder 32 until and unless the aforementioned negative voltage level is applied by switching circuit 31 to conductor 22.

As mentioned above, it is possible that, after completing the dictation of messages, the user of dictate station 20 may return the handset thereof to its cradle improperly. When the dictate station is disposed properly in its on-hook condition, the consequential change in impedance in the current loop results in a change-over in switching circuit 31 from the source of positive voltage to the source of negative voltage, as described in U.S. Pat. No. 3,835,261. This change-over in the voltage level applied to conductor 22 is detected by privacy circuit 26 to supply a set pulse signal to flip-flop circuit 27. As a result, the flip-flop circuit is set to render switching transistor 28 nonconductive. Hence, the current loop between dictate station 20 and recorder 32 is interrupted; and the recorder now is available for seizure by another dictate station.

Preferably, but not necessarily, energizing current is supplied to the usual power supply terminal of flip-flop circuit 27 from conductor 24 or 25 when the dictate station is disposed in its on-hook condition, and from conductor 22 when the recorder is seized by the dictate station. A conventional diode-type OR gate supplies such energizing current to the flip-flop circuit.

If dictate station 20 inadvertently is not returned to its on-hook condition, switching circuit 31 in recorder 32 will not be changed over from the source of positive voltage to the source of negative voltage, and privacy circuit 26 will not supply a set pulse signal to flip-flop circuit 27. Hence, switching transistor 28 will remain conductive and the seizure of the recorder by dictate station 20 will be maintained. To overcome this possibility, and as will be described in greater detail below, processor 44 (FIG. 1) is responsive to suitable commands generated by keyboard 50 to supply, via controller 42, a disconnect signal to recorder 32. This disconnect signal changes over switching circuit 31 in a manner similar to the change-over which would occur if dictate station 20 is returned to its on-hook condition properly. As a result of the disconnect signal, privacy circuit 26 responds to the change-over in the voltage level supplied thereto to set flip-flop circuit 27, whereupon switching transistor 28 is rendered non-conductive. Consequently, recorder 32 is released; and other dictate stations then may seize this recorder for the recording of messages thereon.

It will be appreciated that the supervisory operator may operate keyboard 50 to disconnect a dictate station from a recorder for various reasons, including the seizure of that recorder by an unauthorized or improper dictator, or in the event that the nature of the message being recorded differs from the type for which that recorder is dedicated.

Figure 4:
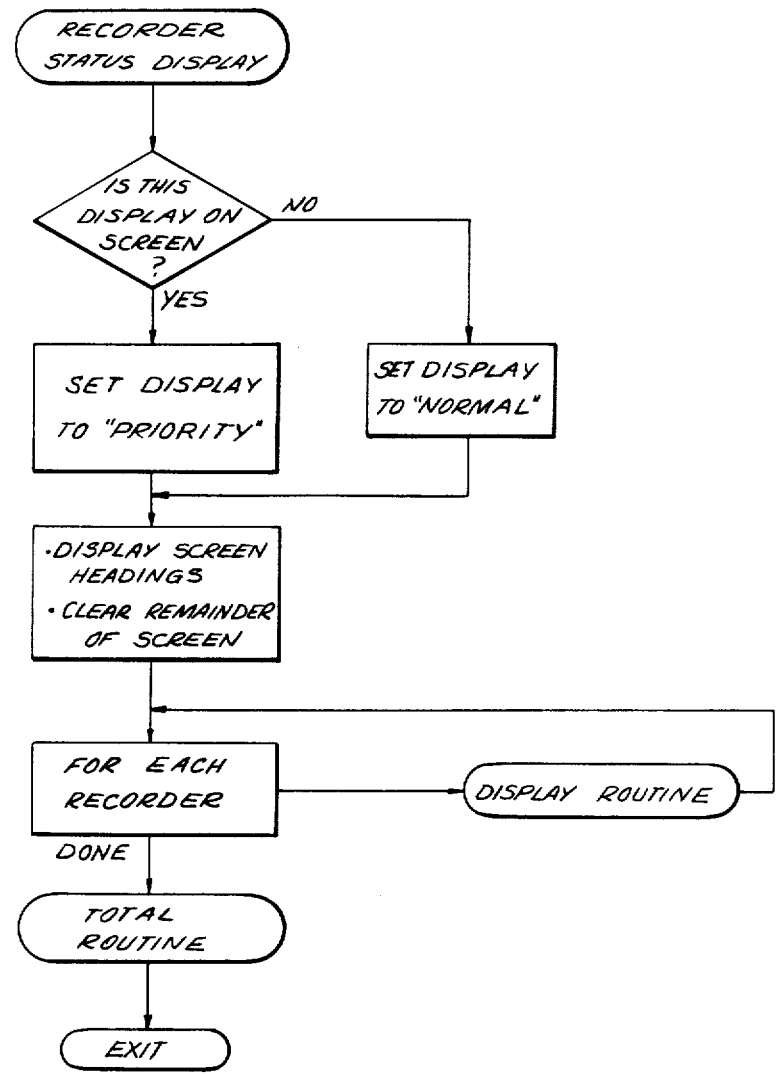
FIG. 4 is a flow chart broadly representing the manner in which the recorder status display operates in accordance with this invention.

The manner in which processor 44 responds to the signals supplied thereto by controller 42 to control display 46 for providing indications of the status of recorders 30 now will be described in conjunction with the flow charts shown in FIGS. 4-11. A representation of the overall routine for the recorder status display is illustrated in FIG. 4. It will be appreciated that the recorder status display is provided in response to a request for same entered manually via keyboard 50. For example, the supervisory operator may actuate a recorder status (REC STA) key to enter the recorder status display routine.

As shown in FIG. 4, the overall recorder status display routine initially inquires whether this particular display (i.e. recorder status display) presently is being displayed by display screen 46 (e.g. the display shown in FIG. 3A). If it is, it is assumed that the supervisory operator has operated keyboard 50 to request the "priority" status display of the type shown in FIG. 3B. Thus, the display will be changed over from a "normal" recorder status display, such as shown in FIG. 3A, to the "priority" recorder status display, such as shown in FIG. 3B. However, if the recorder status display is not presently displayed on display screen 46, processor 44 responds to the operation of keyboard 50 to display the "normal" recorder status display.

After the appropriate display (i.e. "normal" or "priority") is selected, the column headings shown in FIGS. 3A and 3B are displayed, and the remainder of the screen is cleared. Thus, the headings of recorder number (R#), load-leveling technique used for determining availability (LL), condition of the recorder (STATUS), number of the message in position for transcription or, alternatively, the identifying number of the cassette (ITEM), that portion of the capacity of the recorder which has been consumed by messages (PERCENT FULL), identification of the transcriptionist (TR), number of seizures which have been made to record messages on a cassette (CALLS), elapsed time since the first message had been recorded on the cassette (TIME), delay in recovering, or transcribing, a new message on an endless-loop recorder (TAT), length of the recorded messages (LENGTH), and number of jobs which await transcription (JOBS) are displayed. In addition, the information relating to the overall system activity also is displayed, such as the percentage of the storage disc which is filled with information relating to job records (S), the percentage of the archive disc that is filled with job record information (A), the overall system backlog (BACKLOG), the overall delay time in recovering or transcribing a message from the system (TURN-AROUND), the transcription rate of all of the system transcriptionists (RATE) and the date and time of day.

Still further, the occurrence, if any, of an alert condition also is displayed; and, moreover, the designation of the display is indicated, such as "recorder status" or "recorder status priority".

As shown in FIG. 4, after the column headings are displayed on display screen 46, the overall routine advances to carry out the display routine for each recorder. This display routine is described in detail hereinbelow in connection with the flow charts shown in FIGS. 5-9. It will be appreciated that the display routine is carried out for the first recorder, then for the next, and then for the next, and so on until the display routine is executed for each recorder coupled to controller 42. By carrying out this display routine for each recorder, the appropriate information is indicated under the respective column headings.

After the display routine is executed for the last of these recorders, a recorder total routine is carried out, as will be described below with respect to the flow charts shown in FIG. 10. Thereafter, processor 44 exits from the recorder status display routine.

The display routine which is carried out for each recorder now will be described, initially with reference to the flow charts shown in FIG. 5. On entering the display routine, the processor inhibits the data associated with the activity of the recorder under consideration from changing. For example, a recorder may be seized at the time the display routine is entered. In that event, the status of the recorder would change over from, for example, "ready" to "in use". However, this change in the data could result in confusion in the display and, therefore, this change is inhibited temporarily until after the display routine has been carried out. It will be appreciated that this routine is executed, in its entirety, in a matter of milliseconds. Hence, for all practical purposes, the data associated with the recorders will be updated with little, if any, apparent delay.

Next, the recorder display line is cleared. This disposes the display screen in condition to display proper information associated with the respective recorders. That is, any confusion that might otherwise arise because of remanent data from previous displays is avoided. Also, the usual registers and buffers which communicate between processor 44 and display 46 are cleared to avoid inadvertent display of data that may remain from a previous display routine.

After the recorder display line is cleared, inquiry is made of whether controller 42 is connected, at its recorder connecting port, to a recorder. For example, controller 42 may be connected to up to eight separate recorders. The display routine may poll each of the recorder connecting ports of the controller to determine whether a recorder is connected thereto. If no recorder is connected to the port being polled, the display line associated with this recorder remains blank, and the display routine advances directly to point "G" of the flow chart shown in FIG. 9. This will be described in greater detail below. However, if this port of controller 42 is connected to a recorder, the display routine advances to display the identifying number of that recorder.

After the recorder identifying number is displayed, the display routine advances to the "load-leveling" subroutine to display the load-leveling criterion by which the respective recorders are made available for seizure by a dictate station. In the present embodiment, one of three criteria is selectable: (1) all of the recorders connected to controller 42 may be seized, on an equal basis, by any dictate station; (2) the recorders are made available for seizure in sequence, whereby first recorder #1 is made available and then, when this recorder is in use, recorder #2 is made available, and then recorder #3, and so on; and (3) the recorder having the shortest recovery, or turn-around time is made available to be seized by the next dictate station which assumes its off-hook condition. These criteria may be established by, for example, the supervisory operator who may actuate keyboard 50 to enter the selected criterion. Alternatively, suitable selecting switches may be provided in controller 42 or in the switching matrix which is used to couple recorders 30 to dictate stations 20. Such criteria determine, at least in part, the status of the respective recorders.

Figure 5:
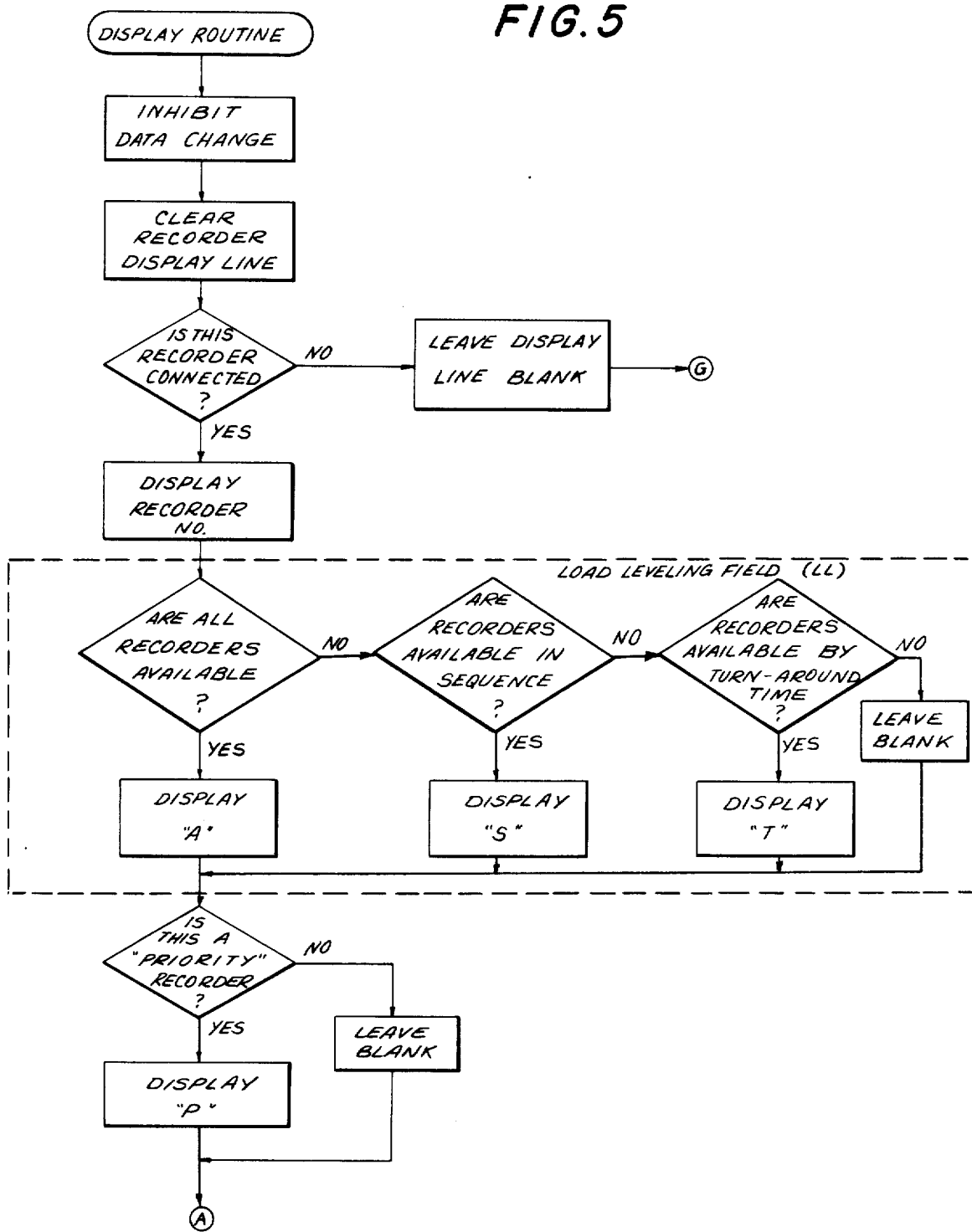
FIG. 5 is a flow chart representing a portion of the recorder status display routine.

As shown in the flow chart of FIG. 5, the particular load-leveling criterion is detected and displayed. This is achieved by inquiring, initially, whether all of the recorders connected to controller 42 are available, on an equal basis, for seizure by a dictate station. If so, the character "A" is displayed and the display routine advances to inquire whether this recorder is a "priority" recorder. However, if all of the recorders are not available on an equal basis for seizure by a dictate station, inquiry is made of whether the recorders are made available in sequence. If so, the character "S" is displayed on this recorder display line under the column heading (LL). Then, the display routine advances to inquire whether this recorder is a "priority" recorder.

However, if the recorders are not made available on an equal basis and are not made available in sequence, inquiry is made of whether the recorders are made available for seizure on the basis of least turn-around time. If this inquiry is answered in the affirmative, the character "T" is displayed on this display line. However, if this inquiry is answered in the negative, this recorder display line remains blank under the column heading (LL).

After detecting and displaying the load-leveling criterion, the display routine advances to inquire whether this recorder is a "priority" recorder. Either an endless-loop recorder or a recorder-changer may be connected as a "priority" recorder. If the latter, the cassette on which a "priority" message is recorded is promptly ejected. A suitable signal will be supplied to controller 42 by those recorders which are connected as "priority" recorders. Preferably, only one recorder in a group of eight will serve as a "priority" recorder. Controller 42, in turn, supplies a corresponding "priority" indicating signal to processor 44. If the recorder whose status now is being displayed is connected as a "priority" recorder, the character "P" is displayed on this recorder display line under the column heading (LL). Alternatively, if this recorder is not connected as a "priority" recorder, the character "P" is not displayed. Thereafter, the display routine advances to the flow chart shown in FIG. 6.

This figure represents the "status" subroutine by which the information in the status column (STATUS) is determined and displayed. Inquiry first is made of whether this recorder has failed. For example, if the magnetic tape in the endless-loop recorder or the recorder-changer jams, a failure indication is supplied therefrom to controller 42. Also, if the supply of cassettes for the recorder-changer has been depleted, or if a cassette is loaded into supply bin 36 in backward relationship, a failure indication is provided. It will be appreciated from the aforementioned patents which describe endless-loop recorders and recorder-changers that various other failure indications may be produced. In the event of one of these failure indications, the word "service" is displayed on this recorder display line under the column heading (STATUS).

However, if the recorder has not failed, inquiry is made of whether the dictator at the dictate station which is in communication with this recorder is attempting to communicate with the supervisory operator. If so, the word "attendant" is displayed and flashed; but, if not, inquiry is made of whether this dictate station is in its off-hook condition.

As mentioned above, it is desirable to sense when an inactive dictate station is connected to a recorder. Once this condition is sensed, the recorder may be released and made available for seizure by other dictate stations. For the purpose of the present discussion, an "inactive" dictate station may be considered to be one which is in its off-hook condition, has seized a recorder and has not commanded tape movement (for recording, playback, or rewind operations) for a predetermined period of time (e.g. fifteen minutes). As an example, whenever tape is commanded to be moved in a recorder, a suitable indicating signal is supplied to controller 42 which, in turn, supplies the same or a similar signal to processor 44. The processor senses an inactive, or off-hook dictate station if this signal is not detected for the aforementioned predetermined period. If the processor senses that the recorder is connected to an inactive, or off-hook, dictate station, the word "off-hook" is displayed and flashed in this recorder display line under the column heading (STATUS).

However, if the processor senses that the dictate station connected to this recorder is not an inactive station, inquiry next is made of whether a previously recorded message now is being re-recorded. For example, in order to better distribute dictation jobs so that they may be transcribed promptly, messages which are recorded on an endless-loop recorder may be re-recorded onto individual cassettes and these cassettes may be distributed to different transcriptionists. If a recorder is being used for such re-recording of dictated messages, the word "re-recording" is displayed and highlighted, or otherwise emphasized, on the display line associated with this recorder. However, if dictated messages are not being re-recorded, the "status" subroutine advances to inquire whether this recorder presently is in use. If so, that is, if the dictate port of an endless-loop recorder is connected either to a dictate station or to a transcribe station, or if a recorder-changer is in communication with an active dictate station, the expression "in use" is displayed and highlighted. Then, inquiry is made of whether the message being recorded is a "priority" message. This may be established by the dictator or, alternatively, by the supervisory operator in accordance with information and instructions supplied by the dictator. For the purpose of the present description, a "priority" message is one which is relatively important and should be transcribed promptly and without delay. If this message is a "priority" message, the character "P" is displayed and highlighted adjacent the expression "in use". However, if this message is not a "priority" message, the character "P" is not displayed.

If this recorder is not in use, inquiry is made of whether it is on line. If a recorder is conditioned such that, subject to the load-leveling criteria mentioned above, it is capable of being connected to a dictate station for recording messages, the recorder is considered to be on line. If this recorder is not on line, the word "unavailable" is displayed. But, if this recorder is on line, inquiry is made of whether it is available to be seized by the next dictate station which is placed in its off-hook condition. The determination of whether this recorder is available is made in conjunction with the aforementioned criteria. For example, if this recorder is one of several that are available on an equal basis to be seized by a dictate station, or if this recorder is next in sequence, or if this recorder exhibits the shortest turn-around time, the expression "ready-next" is displayed and highlighted. But, if this recorder is not in use but is on line; but does not satisfy the aforementioned criteria (e.g. it is not next in sequence or it does not exhibit the shortest turn-around time), the word "ready" merely is displayed.

Examples of the status of, for example, six recorders connected to controller 42 are illustrated in FIG. 3A. Of these, it is seen that recorders #1–3 and 5–6 are "ready" while recorder #4 is "in use".

Figure 7:
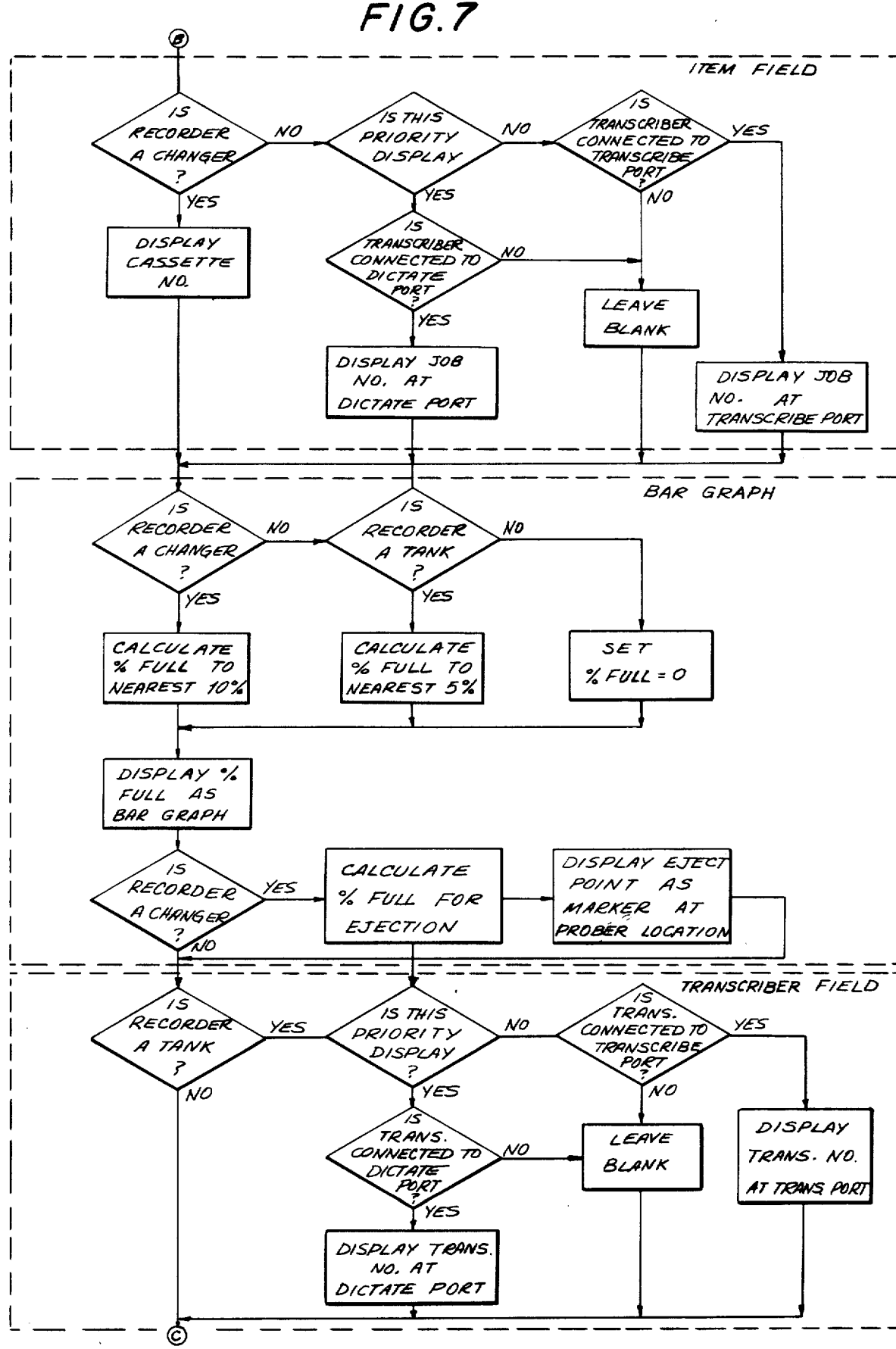
FIG. 7 is a flow chart representing yet a still further portion of the recorder status display routine.
Figure 8:
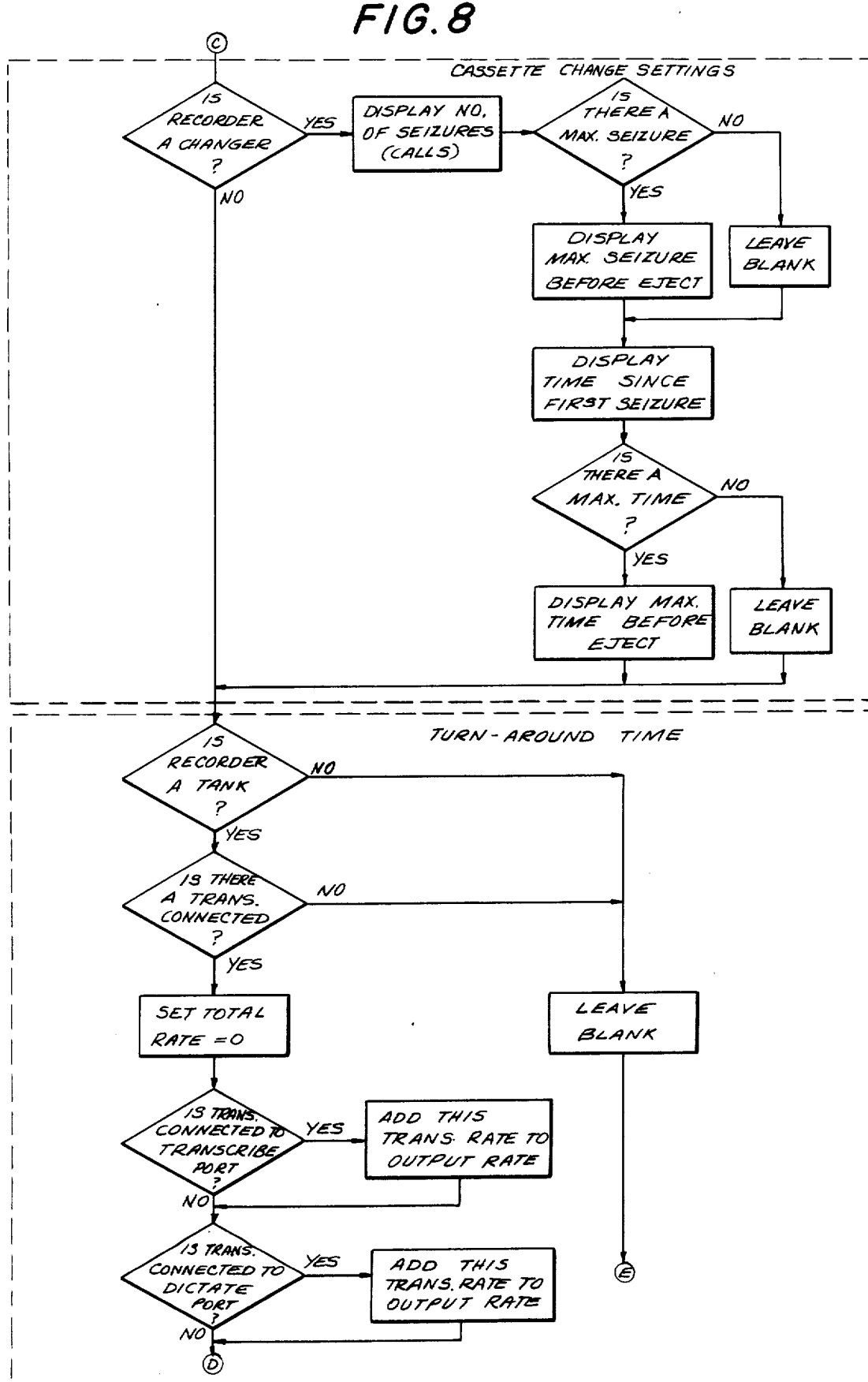
FIG. 8 is a flow chart representing yet another portion of the recorder status display routine.

After detecting and displaying the status of the recorder under inquiry, the display routine advances to carry out the "item" subroutine shown in FIG. 7. In this subroutine, inquiry first is made of whether this recorder is a recorder-changer. If it is, the identifying number of the cassette at the record station thereof is displayed. It is recalled that, preferably, recorder-changer 34 includes an optical reader for reading cassette identifying numbers which may be provided on suitable labels in the form of, for example, bar codes. If the cassette label is obliterated or cannot be read, an appropriate identifying number is assigned thereto. It will be appreciated by those of ordinary skill in the art that other means may be provided to read or provide cassette identifying numbers for the respective cassettes which are used by the recorder-changer.

If, however, this recorder is not a recorder-changer, inquiry is made of whether the requested recorder status display is a "priority" display. As was described above with respect to the overall flow chart shown in FIG. 4, a "normal" or a "priority" recorder status display may be selected by the supervisory operator. If the selected display is a "normal" display, inquiry is made of whether a transcribe station is connected to transcribe port 76 of the endless-loop recorder. If it is, the number of the message which is in condition for transcription, or presently is being transcribed, by this transcribe station is displayed. It is recalled that controller 42 provides signals to processor 44 representing the lengths and numbers of messages which await transcription, and also the number of the message then in condition for transcription (or which is being transcribed) by the transcribe station. However, if a transcribe station is not connected to transcribe port 76, the item field on this recorder display line remains blank.

If the requested recorder status display has been selected as a "priority" display, inquiry is made of whether a transcribe station is connected to dictate port 66 of the endless-loop recorder. If not, the item field on this recorder display line remains blank. However, if a transcribe station is connected to the dictate port, the number of the message then in condition for transcription, or presently being transcribed, at the dictate port is displayed.

Thus, the item field displays either the identifying number of the cassette at the recording station of a recorder-changer or, alternatively, the number of the message which is, or is about to be, transcribed from either the transcribe or dictate ports of an endless-loop recorder. Examples of the item fields are illustrated in FIGS. 3A and 3B. With respect to recorder #3, for example, it is seen that message #1 is being transcribed from the transcribe port and message #2 is in condition to be transcribed from the dictate port.

After determining and displaying the item field for this recorder, the display routine advances to execute the "bar graph" subroutine. This subroutine functions to display a graphical representation of that portion of the recording capacity of the recorder which is consumed by messages awaiting transcription. For example, an endless-loop recorder may exhibit a recording capacity of about three hours. The bar graph subroutine functions to display a bar graph representation of that percentage of this three-hour recording capacity which is consumed by messages awaiting transcription. Similarly, a typical cassette used in the cassette-recorders may exhibit a recording capacity of about thirty minutes. Here too, the bar graph subroutine functions to display a graphical representation of that percentage of this thirty minute capacity which is consumed by recorded messages.

The initial inquiry of the "bar graph" subroutine is whether the recorder is a recorder-changer. If not, inquiry is made of whether this recorder is an endless-loop recorder. If the recorder is neither a recorder-changer nor an endless-loop recorder, the percentage of recording capacity is set equal to zero. However, if the recorder is an endless-loop recorder, the percentage of capacity is calculated to the nearest 5%. If the recorder is a recorder-changer, the percentage of capacity is calculated to the nearest 10%.

It is recalled that length-of-tape signals are generated in both the endless-loop recorder and the recorder-changer as tape is advanced. One example of apparatus which operates to generate such signals is found in U.S. Pat. No. 4,200,893, and another example is found in U.S. Pat. No. 4,092,680. An example of apparatus in an endless-loop recorder which may produce such signals is found in U.S. Pat. No. 3,965,484.

It is preferred to calculate the percentage of capacity in 5% increments for endless-loop recorders and in 10% increments for recorder-changers because the endless-loop recorder has a greater recording capacity (three hours as opposed to thirty minutes). However, if desired, the percentage of capacity for the endless-loop recorder may be calculated in the same increments (5% or 10%) as for the recorder-changer.

After calculating the percentage of capacity which has been consumed by messages awaiting transcription, this calculated percentage is displayed in the form of a bar graph. In the interest of simplification, the routine by which display 46 is controlled to produce this graphical representation is not described. Those of ordinary skill in the computer and programming arts will recognize how this can be carried out. Hence, to describe this known routine would merely obfuscate the instant specification.

After displaying the bar graph representation of that portion of the tape which is consumed by messages awaiting transcription, inquiry is made as to whether this recorder is a recorder-changer. If not, the display routine advances to the "transcriber" subroutine. However, if the recorder is a recorder-changer, the preset tape consumption which results in tape ejection is calculated in terms of the percentage of the overall tape capacity. As mentioned above, and as described in U.S. Pat. No. 4,092,679, any portion (in, for example, 10% increments) of the capacity of the tape cassette which results in ejection of the cassette may be selected, or preset, as desired. When this preset portion has been consumed by messages, the cassette will be ejected from the recorder-changer following release of the recorder by the dictate station. This preset portion may be in terms of minutes, such as thirty minutes (the full capacity of the usual cassette), or increments of three minutes (i.e. 10% increments), and is calculated as a percentage of the full capacity (thirty minutes). After this percentage has been calculated, a marker is displayed at the proper location along the bar graph associated with this recorder-changer. Thus, if the preset tape length is established to be thirty minutes, the marker is displayed at a point equal to 100% of the full bar graph length. If the preset tape length for ejection is established to be, for example, twenty-one minutes, the marker is displayed at the location corresponding to 70% of the full bar graph. Thus, display screen 46 displays not only a bar graph representation of the amount of tape which has been consumed but, in addition, indicates that point along the bar graph which, when reached, results in the ejection of the cassette. This eject-point marker is illustrated in FIG. 3A by the triangular marker on the display line associated with recorder #5 under the column heading (PERCENT FULL).

After calculating and displaying the eject-point for the recorder-changer, the display routine advances to the "transcriber" subroutine. Inquiry first is made of whether the recorder is an endless-loop recorder. If not, the subroutine advances to the "cassette change setting" subroutine, described below in conjunction with the flow chart shown in FIG. 8. However, if the recorder is an endless-loop recorder, inquiry is made as to whether the "priority" recorder status display has been selected.

If the supervisory operator has selected the "normal" recorder status display, inquiry is made of whether a transcribe station is connected to the transcribe port of the endless-loop recorder. If not, the transcriber field position on this recorder display line remains blank. However, if a transcribe station is connected to the transcribe port, the identifying number of this transcribe station is displayed. Similarly, if the "priority" recorder status display has been selected, inquiry is made of whether a transcribe station is connected to the dictate port. If not, the transcriber field for this recorder display line in the "priority" display remains blank. But, if a transcribe station is connected to the dictate port, the identifying number of that station is displayed. Then, the display routine advances to the "cassette change setting" subroutine now described in conjunction with the flow chart shown in FIG. 8.

The "cassette change setting" subroutine is executed only if the recorder in question is a recorder-changer. Hence, inquiry first is made of whether this recorder is a recorder-changer. If not, the display routine merely advances to the "turn-around time" subroutine. But, if the recorder in question is a recorder-changer, the number of seizures which have been made to this recorder for recording messages on the cassette positioned at the record station thereof is displayed. It is recalled that each recorder-changer supplies controller 42 with signals representing the number of seizures which have been made thereto for recording on a particular cassette. When that cassette is ejected from the record station, the counter which is used to calculate the number of seizures is reset. Suitable counting circuitry is described in U.S. Pat. No. 4,092,679.

After the actual number of seizures has been displayed (under the column heading CALLS), inquiry is made of whether a maximum, or preset, number of seizures before ejection has been established. As described in the last-mentioned patent, a desired number of seizures may be selected, whereupon the cassette is ejected from the record station when the recorder next is released. Signals representing this preset number may be supplied from the recorder-changer to controller 42 and thence to processor 44. This preset number, if established, is displayed as the maximum number of seizures which can occur before the cassette is ejected. If, however, such a preset number has not been established, this portion of the recorder display line remains blank. In the example shown in FIGS. 3A and 3B, five seizures should occur for recorder-changer #5 before the cassette is ejected. As also illustrated, no preset number of seizures has been established for recorder-changer #6.

After displaying the maximum number of seizures which may occur before the cassette is ejected, the "cassette change setting" subroutine advances to display the actual time which has elapsed since the initial, or first, seizure for recording on this cassette. Although not shown, it is appreciated that controller 42 and/or processor 44 may include suitable timers which are actuated in response to the initial seizure for recording on a cassette. The time determined by such timers is displayed.

Thereafter, inquiry is made of whether a maximum time before ejection has been set. As mentioned above, it is desirable to establish a predetermined "idle" time for a cassette following the initial seizure thereof. This idle time setting insures ejection of the cassette for the recording of at least the initial message thereon even if the recorder-changer is not seized again for a long period of time. In the absence of a subsequent seizure, the cassette nevertheless will be ejected upon the expiration of the preset idle time. If such a maximum idle time setting has been established, this setting is displayed. If no such idle time setting has been set, this portion of the recorder display line remains blank. In FIGS. 3A and 3B, it is seen that maximum idle times have not been established for recorder-changers #5 and #6. However, it is further seen that ten time units have elapsed since the initial seizure to recorder #6 for recording on the cassette therein. In the present example, the unit of time for measuring elapsed time is a minute.

After completing the "cassette change setting" subroutine, the display routine advances to the "turn-around time" subroutine. It is recalled that turn-around time is a measure of the expected recovery time delay in recovering, or transcribing, a newly-recorded message. Since messages may be recorded and transcribed simultaneously on the endless-loop recorder, a display of turn-around time is meaningful only with respect to such endless-loop recorders. By reason of the fact that messages are transcribed from cassettes at separate transcribe stations, and in view of unanticipated delays which may be present in locating a transcriptionist who can transcribe the messages, turn-around time data is neither determined nor displayed for recorder-changers. Hence, in the "turn-around time" subroutine, inquiry first is made of whether the recorder is an endless-loop recorder. If it is not, that portion of the recorder display line under the column heading (TAT) remains blank.

If the recorder in question is an endless-loop recorder, inquiry is made as to whether a transcribe station is connected thereto. If not, no turn-around time data is displayed. However, if a transcribe station is connected to the endless-loop recorder, a transcribe rate register initially is set equal to zero. As will become apparent, this register stores the rate at which a transcriptionist transcribes previously recorded messages. This rate generally is in terms of lines (e.g. lines of typing) per minute. Typically, in a central dictation system, the individual transcribe rates of the respective transcriptionists will be known from experience. Such transcribe rates may be on the order of about ten lines per minute.

After the transcribe rate register is set equal to zero, inquiry is made of whether the transcribe station is connected to the transcribe port. If it is, the transcribe rate of the transcriptionist stationed at this transcribe station is added to the transcribe rate register. If not, the transcribe rate stored in this register remains equal to zero.

Thereafter, inquiry is made of whether a transcribe station is connected to the dictate port of the endless-loop recorder. If it is, the transcribe rate of the transcriptionist located at this station also is added to the transcribe rate register. If, however, no transcribe station is connected to the dictate port, nothing further is added to the transcribe rate register.

The contents of the transcribe rate register now represent the total transcription rate at which messages may be transcribed at both the transcribe and dictate ports. If one or the other (or both) of these ports is not connected to a transcribe station, this fact is reflected in the contents of the transcribe rate register. Information representing the respective rates of transcription may be entered by way of keyboard 50 into processor 44.

Figure 9:
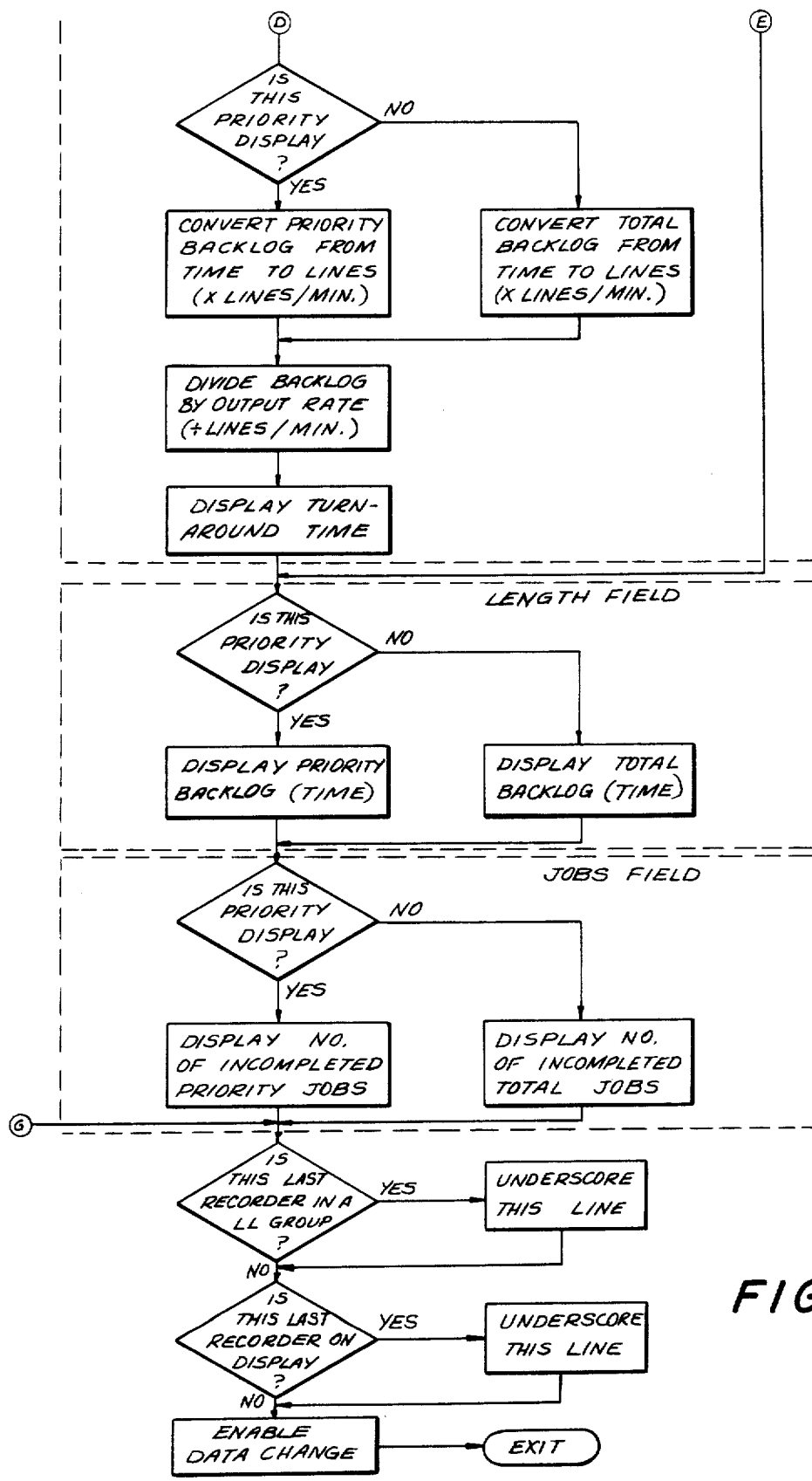
FIG. 9 is a flow chart representing still an additional portion of the recorder status display routine.

Continuing with the description of the "turn-around time" subroutine, and with reference now to the flow chart shown in FIG. 9, after the contents of the transcribe rate register are established, inquiry is made of whether the recorder status display on display screen 46 is a "priority" display. If not, the total backlog, or length of messages awaiting transcription, is converted from time units to units of lines. Stated otherwise, this total dictation backlog is multiplied by a predetermined number of lines per minute. This number is representative of the average number of lines that may be typed in response to each minute of dictation. It will be recognized that the "total" backlog represents the length (in terms of time) of all messages that have been recorded on tape T but have not yet been transcribed. Hence, the total length (in terms of time) of messages awaiting transcription is converted from units of time to units of lines of typing.

If the recorder status display is a "priority" display, and if the recorder in question is the "priority" recorder, then the backlog in this recorder is converted from units of time to units of lines. If a transcribe station is connected to the dictate port of the recorder in question, then the length of those messages which are to be transcribed from the dictate port is converted to units of lines. Thus "priority" backlog refers to the backlog of "priority" messages which are to be transcribed.

After the appropriate backlog (either total or "priority") has been converted from units of time to units of lines, this backlog is divided by the contents of the transcribe rate register. Since the transcribe rate register represents the rate at which messages are transcribed in units of lines per minute, it is appreciated that the quotient of backlog (in terms of lines) divided by transcribe rate (in terms of lines/minute) will be in units of time. Such time units may be displayed as minutes, hours, or the like. In any event, the derived quotient represents turn-around time, and is displayed on this recorder display line under the column heading (TAT).

Thus, it is appreciated that the expected recovery, or turn-around, time is a function of the length of messages awaiting transcription and the rate at which such messages are transcribed.

The display routine next advances to the "message length" subroutine. In executing this subroutine, inquiry first is made of whether the recorder status display is a "priority" display. If it is, the aforementioned "priority" backlog is displayed in time units (FIG. 3B). It is recalled that, in calculating the turn-around time, such "priority" backlog had been ascertained in time units and then had been converted into units of lines. Such backlog merely is displayed, in its original form, on this recorder display line under the column heading (LENGTH).

Similarly, if the recorder status display is not a "priority" display, the total backlog, or total length of messages awaiting transcription, is displayed in units of time (FIG. 3A).

Next, the display routine advances to the "message number" subroutine and inquires once again whether the recorder status display is a "priority" display. If it is, the number of "priority" messages awaiting transcription is displayed. This is illustrated in FIG. 3B. Alternatively, if the recorder status display is a "normal" display, the total number of messages awaiting transcription is displayed, as shown in FIG. 3A.

As mentioned above, controller 42 is supplied with signals for each recorder representing the completion, or end-of-messages. Such signals may be counted, for example, by a suitable counter provided at the controller, to accumulate a count representing the total number of messages which have been recorded. Similarly, when each message is transcribed, a "message completed" signal may be generated and counted or, alternatively, the end-of-message signals may be sensed and counted, again by a suitable counting device provided at, for example, the controller, to represent the total number of messages which have been transcribed. The difference between the aforementioned counts represents the total number of messages which have been recorded and are awaiting transcription. This difference between the counts may be ascertained by suitable circuitry or processor-controlled software either in controller 42 or in processor 44, as desired.

After displaying the number of messages awaiting transcription, the display routine advances to an "underscore" subroutine. From the flow chart shown in FIG. 5, it is appreciated that this "underscore" subroutine is executed directly (from point "G") in the event that a recorder is not connected to this polled port of controller 42.

In executing the "underscore" subroutine, inquiry first is made of whether this recorder is the last recorder in a "load-leveling" group. As described above, recorders may be arranged in load-leveling groups of two, four, eight, or any other desired number. Alternatively, such grouping of the recorders may be omitted. However, if this is the last recorder in a load-leveling group, then this recorder display line is underscored. Although not described herein, it will be recognized by those of ordinary skill in the art that suitable software routines may be used to control a video display to provide such underscores.

After this recorder display line is underscored, or alternatively, if this recorder is not the last one in a load-leveling group, inquiry is made as to whether this is the last recorder for which information is displayed. If so, this recorder display line is underscored. Then, or in the alternative, if this is not the last recorder for which information is displayed, data relating to the activity of this recorder now is enabled to be updated. The processor then exits from this display routine.

As described above with respect to the flow chart shown in FIG. 4, the foregoing display routine is repeated for each recorder that may be connected to a recorder connecting port of controller 42. More accurately, this display routine is repeated as each of the controller ports is polled. When the last such controller port is polled, and the status of the recorder connected thereto is determined and displayed, the processor advances to the total routine, which is shown more particularly in the flow chart of FIG. 10.

The total routine functions to accumulate the average recovery, or turn-around, time for all of the endless-loop recorders included in the central dictation system. Furthermore, the total routine provides an indication of the total number and length of messages which have been recorded on these recorders of the central system.

Figure 10:
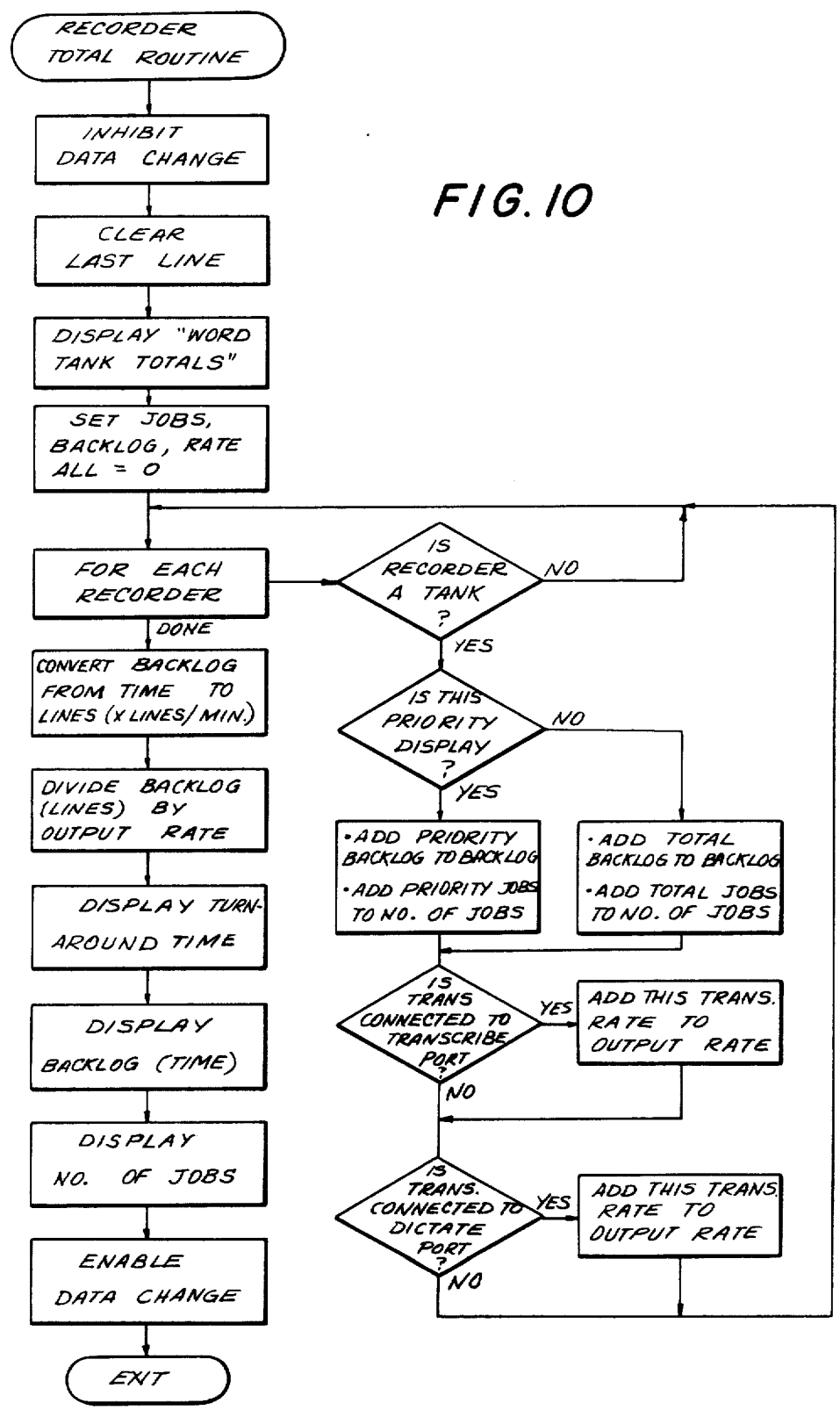
FIG. 10 is a flow chart representing the routine by which the status of certain items in the overall central dictation system are totaled and displayed.
Figure 11:
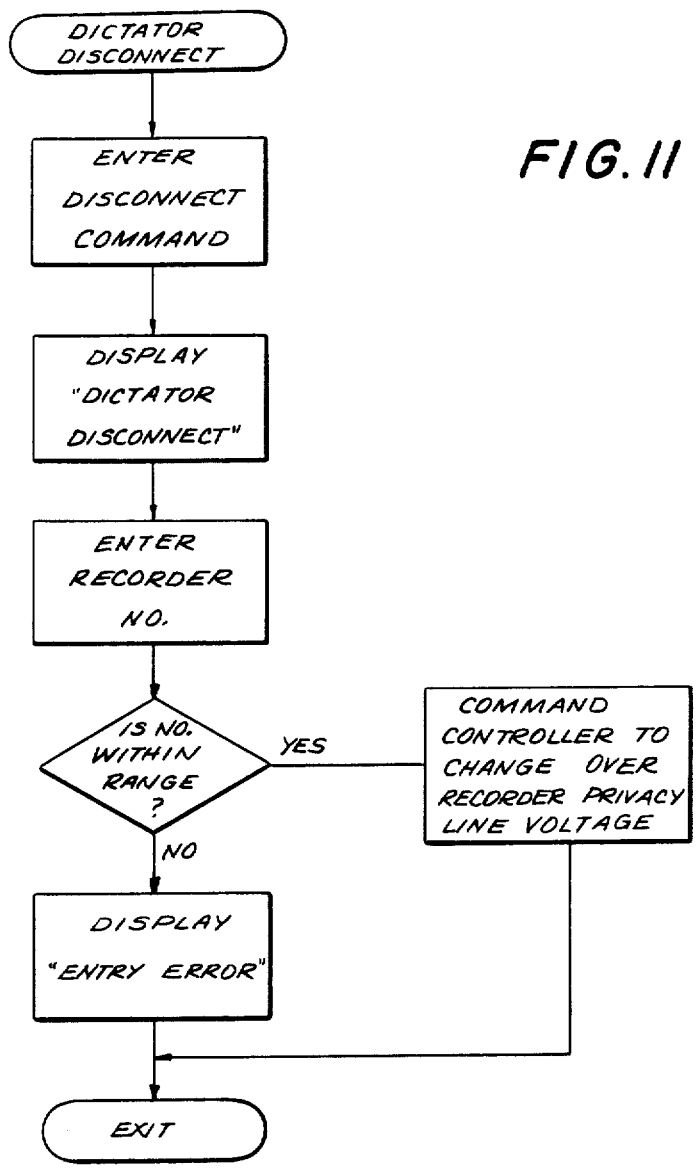
FIG. 11 is a flow chart representing the routine by which the remote disconnect feature is carried out.

Turning to FIG. 10, in executing the total routine, changes, or updates, in the data associated with the recorders of the central dictation system are inhibited. Then, the last line of the display is cleared, and the expression "word tank totals" is displayed thereat. It will be recognized that "word tank" refers to an endless-loop recorder. Thereafter, registers which store the number of messages, backlog and overall rate of transcription are cleared, or set equal to zero. Then, for each recorder, a subroutine is carried out. This subroutine is repeated until information relating to the last recorder is obtained.

The subroutine which is executed for each recorder initially inquires whether the recorder is an endless-loop recorder. If it is not, this subroutine is carried out for the next recorder, and so on, until the inquiry is answered in the affirmative. In response to an affirmative answer, inquiry next is made as to whether the recorder status display is a "priority" display. If not, the total backlog of this recorder is added to the contents of the backlog register, and the total number of messages which await transcription in this recorder is added to the message register. This information had been ascertained when executing the "length" and "message number" subroutines shown in the flow chart of FIG. 9.

If the recorder status display is a "priority" display, then the "priority" backlog of the recorder and the number of "priority" messages awaiting transcription therein are added to the backlog and message registers, respectively.

Thereafter, inquiry is made of whether a transcribe station is connected to the transcribe port. If it is, the rate at which messages are transcribed by this transcribe station is added to the output rate stored in the transcribe rate register. It is recalled that this transcribe rate is entered into processor 44 by way of keyboard 50.

After the transcribe rate register is updated or, alternatively, if the transcribe port is not connected to a transcribe station, inquiry is made of whether a transcribe station is connected to the dictate port. If it is, the rate at which this transcribe station operates to transcribe messages is added to the output rate stored in the transcribe rate register. Thereafter, the foregoing subroutine is repeated for the next recorder.

From the foregoing, it is appreciated that the backlog register stores information representing the total, or summed, backlog for all of the endless-loop recorders. Likewise, the message register stores the total number of messages which are awaiting transcription in all of the endless-loop recorders. Finally, the transcribe rate register stores the total of the individual transcribe rates associated with the respective transcribe stations that are connected to the transcribe and dictate ports of all of the endless-loop recorders.

After all of this information is summed in the respective backlog, message and transcribe rate registers, the total backlog is converted from units of time to units of lines. As mentioned above with respect to the flow chart shown in FIG. 9, this backlog data is multiplied by a factor representing the average number of typing lines per minute of dictation by an average dictator. Then, this backlog, in terms of lines, is divided by the summed output rate stored in the transcribe rate register. Since this summed output rate is in terms of lines per minute, the resultant quotient represents the average recovery, or turn-around, time for all of the endless-loop recorders. This determined turn-around time is displayed at the bottom line of the recorder status display.

Next, the summed backlog, in terms of time, is displayed. Thereafter, the total number of messages awaiting transcription in all of the endless-loop recorders also is displayed.

This completes the total routine and, prior to exiting from this routine, changes or updates in the data associated with the status of the respective recorders now are enabled.

Figure 6:
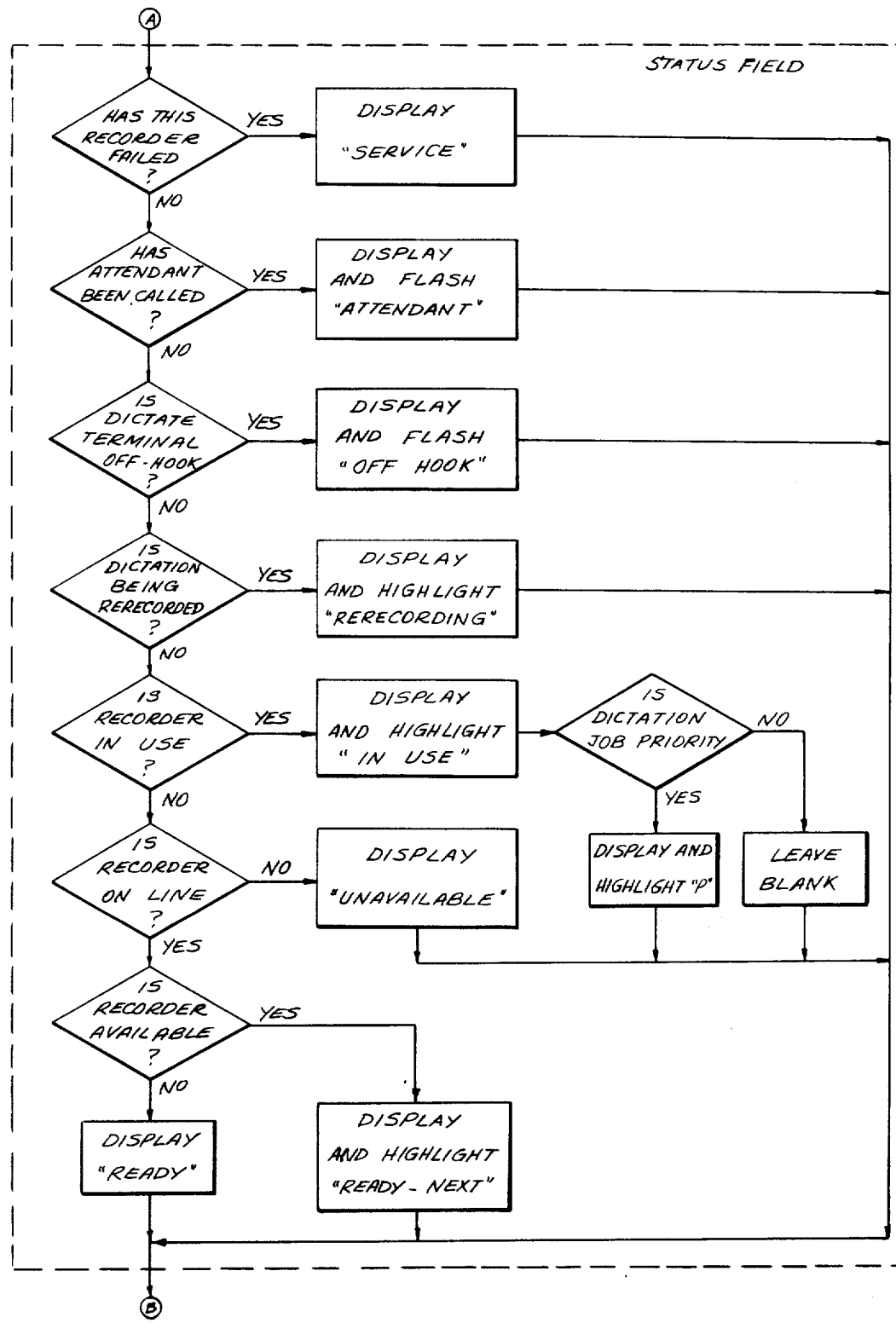
FIG. 6 is a flow chart representing still another portion of the recorder status display routine.

From the "status" subroutine described above in conjunction with the flow chart shown in FIG. 6, it is recalled that an off-hook condition of an inactive dictate station is displayed by flashing the expression "off-hook" in the appropriate recorder display line under the column heading (STATUS). This is recognized by the supervisory operator as indicating the seizure of a corresponding recorder by an inactive dictate station. From the description of FIG. 2 above, it is recognized how this recorder is released from the inactive dictate station. The command to change over the voltage level on the appropriate conductor (e.g. conductor 22) which extends between the recorder and the privacy circuit included in the dictate station is effected by processor 44 in response to a keyboard entry via keyboard 50. The manner in which this release, or disconnect, command is generated is illustrated by the flow chart shown in FIG. 11.

Initially, the supervisory operator enters the disconnect command by actuating an appropriate one of the keys of keyboard 50. Processor 44 controls display 46 to display the expression "disconnect dictator" in an appropriate location on the display screen, such as in place of the displayed expression "recorder status". The number of the recorder from which the dictator is to be disconnected also may be displayed.

Thereafter, the supervisory operator enters, by way of keyboard 50, the identifying number of the recorder which is to be released. To check that the operator has not erred in entering the recorder identifying number, inquiry is made as to whether this number is within the appropriate range. For example, if the monitoring and displaying apparatus of the present invention is cooperable with up to sixteen recorders, inquiry is made as to whether the recorder identifying number entered by the operator is within the range 1 to 16. If it is not, the expression "entry error" is displayed.

If, however, the selected recorder identifying number is within the appropriate range, controller 42 is commanded to supply a change-over signal to this recorder to change-over switching circuit 31 from supplying, for example, the positive voltage level to conductor 22 now to supply the negative voltage level thereto. This change over in the voltage level supplied to conductor 22 is detected by privacy circuit 26 which, in turn, sets flip-flop circuit 27 to render switching transistor 28 nonconductive. As a result, the inactive dictate station releases the recorder.

After commanding controller 42 to effect the aforementioned voltage level changeover, processor 44 exits from the disconnect routine and is made ready to carry out a subsequent operation.

From the foregoing description, it is seen that the present invention relates to an information processing system in general, and to a central dictation system in particular, having a monitoring and displaying apparatus for monitoring and displaying information regarding the activity of the system. In particular, the status of individual information recorders is displayed. With particular reference to the use of the present invention in a central dictation system, the availability of each recorder for the recording of messages, the number and length of messages recorded in each recorder, the expected delay in transcribing new messages, the identification of the particular message in position for transcription and the portion of the recording capacity which has been consumed, all are displayed. Moreover, status data pertaining to messages that are recorded on a "priority" recorder or that are identified as "priority" messages or that are to be transcribed on a "priority" basis may be selectively displayed. Still further, in the event that a recorder remains seized by an inactive, or "off-hook" dictate station, means are provided to effect the remote release of that recorder, thus freeing it for seizure by other dictate stations.

While the present invention has been particularly shown and described with reference to a preferred embodiment, it will be readily appreciated by those of ordinary skill in the art that various changes and modifications in form and details may be made without departing from the spirit and scope of the invention. For example, the information processing system with which this invention may be used need not be limited solely to a central dictating system. The activity of a digital data processing system having remote input terminals, information storage and processing devices and output terminals may be monitored and displayed by the apparatus disclosed herein. Furthermore, the particular signals which are utilized by the processor of the present invention may be supplied thereto either by the controller shown in FIG. 1 or, alternatively, by means of a suitable interface device disposed between the processor and the respective recorders. Still further, in addition to, or in place of, displaying status data on a video display screen, as described herein, this status data may be printed in the form of a hard copy by, for example, printer 56.

It is intended that the appended claims be interpreted as including the embodiment specifically described herein and equivalents thereto.

What is claimed is:

1. In an information processing system having plural recorders for recording information jobs, plural originating stations for supplying information jobs to be recorded, means for selectively connecting originating stations to recorders, recovery stations for recovering information jobs from at least some of said recorders, means for connecting said recovery stations to said some recorders, and monitoring means for monitoring information recording and recovery activity of respective recorders, apparatus comprising: delay means for determining the difference between lengths of information jobs recorded on a recorder and lengths of information jobs recovered from that recorder, and for calculating therefrom the expected recovery delay in recovering an information job to be recorded on said recorder and for producing signals indicating the recovery delay; job counting means for producing count signals representing the difference between the number of information jobs that have been recorded on a recorder and the number of information jobs that have been recovered from that recorder to indicate the number of information jobs that are recorded on and are awaiting recovery from said recorder; signal control means coupled to each of said recorders for receiving the produced signals and for providing signals representing the number of recorded information jobs awaiting recovery from, and the recovery delay of respective recorders; and display means coupled to said signal control means and responsive to at least some of the provided signals for displaying alphanumeric characters representing recovery delay in the number of information jobs awaiting recovery from respective recorders.

2. The apparatus of claim 1 wherein said display means includes a video display screen on which said alphanumeric characters are displayed.

3. The apparatus of claim 1 wherein said display means additionally displays alphanumeric characters representing the lengths of recorded information jobs awaiting recovery from respective recorders.

4. The apparatus of claim 1 wherein said signal control means includes means for providing signals representing that said respective recorders are connected to said signal control means; and wherein said display means includes means responsive to each of said last-mentioned signals for displaying alphanumeric character representing those recorders which are connected to said signal control means and can be used by said originating stations.

5. The apparatus of claim 1 wherein said signal control means further includes criterion selecting means for establishing a selected one of different predetermined criteria by which recorders are made available to receive information from originating stations; and further comprising availability means for sensing which of said recorders satisfy said selected criterion and for producing signals indicating that a recorder is available to receive information from an originating station; said signal control means receiving the last-mentioned signals and providing signals representing the availability of respective recorders to receive information from an originating station, and said display means responding to the provided signals for displaying availability of said respective recorders.

6. The apparatus of claim 5 wherein said criterion selecting means is operative to make available: (a) all of said recorders, (b) a set of recorders in a predetermined sequence, or (c) the recorder having at least expected recovery delay, and wherein said display means displays alphanumeric characters representing the criterion established by said criterion selected means.

7. The apparatus of claim 6 wherein said availability means further senses which of said recorders is receiving information from an originating station and which of said recorders satisfy the criteria established by said criterion selecting means to next receive information from an originating station.

8. The apparatus of claim 1 further including recovery counting means incremented as each new information job is in conditions to be recovered from a respective recorder; and wherein said display means further includes means responsive to said recovery counting means for displaying alphanumeric characters representing the number of the information job to be recovered.

9. The apparatus of claim 1 wherein each said recorder has a predetermined recording capacity to record information jobs having a predetermined cumulative length; and wherein said display means further includes means responsive to said length of recorded information jobs determined by said delay means for calculating the portion of said predetermined recording capacity consumed by information jobs, and means for displaying the calculated consumed portion for respective recorders.

10. The apparatus of claim 9 wherein said means for displaying the calculated consumed portion comprises a bar graph display.

11. The apparatus of claim 1 wherein said signal control means additionally provides a recovery station identifying signal identifying the recovery stations connected to respective recorders; and wherein said display means further includes means responsive to the recovery station identifying signal for displaying alphanumeric characters representing the identities of said recovery stations.

12. The apparatus of claim 1, further comprising means for manually providing a signal representing the rate at which information jobs are recovered at a respective recovery station; and wherein said delay means further includes means for arithmetically combining the determined difference between lengths of information jobs recorded on a recorder and lengths of information jobs recovered from that recorder with the signal representing the rate at which information jobs are recovered at said respective recovery station to determine said expected recovery delay.

13. Apparatus for displaying status of individual recorders in a central dictation system having a plurality of dictate stations to seize said recorders for recording messages on record media therein, a plurality of transcribe stations, each having an associated transcribe rate, for transcribing recorded messages from said record media, means for connecting a dictate station to a recorder and for connecting a transcribe station to a recorder, and signal control means coupled to each of said recorders and responsive to the connections thereto of respective dictate and transcribe stations for recording and transcribing messages to provide signals representing respective identifying numbers of messages that are on said record media in position to be transcribed, and signals representing amounts of record media of respective recorders consumed by said messages, said apparatus comprising display means for displaying alphanumeric characters representing the status of said respective recorders; and processor means responsive to the signals provided by said signal control means to control said dispaly means, said processor means including message number means for detecting the identifying numbers of the message positioned to be transcribed from said record media and for providing said display means with information to display said identifying message numbers for respective recorders, and delay determining means responsive to the signals representing the amount of record media of respective recorders consumed by messages and the transcribe rates associated with the transcribe stations connected to said respective recorders to determine an expected delay in transcribing newly recorded messages and for providing said dispaly means with information to display the expected delay of said respective recorders.

14. The apparatus of claim 13 wherein said respective recorders include means for producing signals representing the amount of record medium in a recorder having messages recorded thereon and the amount of record medium having messages transcribed therefrom, and wherein said signal control means is responsive to the last-mentioned signals to produce a signal representing the length of messages in a respective recorder awaiting transcription; and wherein said delay determining means responds to said signal representing the length of messages in a respective recorder awaiting transcription and a transcribe rate associated with the transcribe station connected to said respective recorder to determine said expected delay in transcribing newly recorded messages.

15. The apparatus of claim 14 further including keyboard means manually operable for producing signals representing the transcribe rates associated with the transcribe stations connected to said respective recorders.

16. The apparatus of claim 13 further including first means for determining if all of the recorders coupled to said signal control means are accessible on an equal basis to said dictate stations; second means for determining if the recorders coupled to said signal control means are accessible in a predetermined sequence; and third means for determining if the recorders coupled to said signal control means are accessible as a function of the expected delay therein in transcribing newly recorded messages.

17. The apparatus of claim 16 further including first sense means for sensing a failure condition in any of the recorders coupled to said signal control means and providing said display means with information to provide an indication thereof; second sense means for sensing the seizure of a recorder by an inactive dictate station and providing said display means with information to provide an indication thereof; third sense means for sensing the seizure of a recorder by an active dictate station and providing said display means with information to provide an indication thereof; fourth sense means for sensing which of the recorders connected to said signal control means is next to be seized by a dictate station and providing said display means with information to provide an indication thereof; and fifth sense means for sensing which recorders are not connected to said signal control means and providing said display means with information to provide an indication thereof.

18. The apparatus of claim 17 further including keyboard means manually operable to supply a disconnect control signal to said signal control means; and wherein said signal control means includes means responsive to said disconnect control signal to supply to a recorder connected thereto a signal for releasing from said recorder an inactive dictate station.

19. The apparatus of claim 18 wherein said keyboard means includes means manually operable for identifying the recorder from which the inactive dictate station is to be released.

20. The apparatus of claim 13 wherein said processor means further includes means for representing the capacity of the record medium at a respective recorder for recording messages; and bar graph generating means for determining that portion of said capacity consumed by messages and for controlling said display means to display a bar graph representation of said portion.

21. The apparatus of claim 13 wherein at least some of the recorders coupled to said signal control means comprise endless loop recorders, each having a dictate port connectable to a dictate station for receiving messages for recording and a transcribe port connectable to a transcribe station for playing back messages for transcription.

22. Apparatus for displaying status of individual recorders in a central dictation system having a plurality of dictate stations to seize said recorders for recording messages on record media therein, a plurality of transcribe stations, each having an associated transcribe rate, for transcribing recorded messages from said record media, means for connecting a dictate station to a recorder and for connecting a transcribe station to a recorder, at least some of the recorders comprising endless loop recorders, each having a dictate port connectable to a dictate station for receiving messages for recording and a transcribe port connectable to a transcribe station for playing back messages for transcription and signal control means coupled to each of said recorders and responsive to the connections thereto of respective dictate and transcribe stations for recording and transcribing messages to provide signals representing respective identifying numbers of messages that are on said record media in position to be transcribed, and signals representing amounts of record media of respective recorders consumed by said messages, said apparatus comprising display means for displaying alphanumeric characters representing the status of said respective recorders; and processor means responsive to the signals provided by said signal control means to control said display means, said processor means including message number means for detecting the identifying numbers of the messages positioned to be transcribed from said record media and for providing said display means with information to display said identifying message numbers for respective recorders, and delay determining means responsive to the signals representing the amount of record media of respective recorders consumed by messages and the transcribe rates associated with the transcribe stations connected to said respective recorders to determine an expected delay in transcribing newly recorded messages and for providing said display means with information to display the expected delay of said respective recorders; and wherein the dictate port of at least one of said endless loop recorders is connectable to a transcribe station for transcribing messages thereat for "priority transcription".

23. The apparatus of claim 22 wherein said signal control means further provides signals representing the connections of transcribe stations to the transcribe ports or dictate ports of respective endless loop recorders and signals representing the lengths of predetermined ("priority") messages in said respective recorders awaiting transcription; and wherein the delay determining means included in said processor means is additionally responsive to the transcribe rates associated with the transcribe stations connected to the transcribe ports and dictate ports or respective endless loop recorders and to the signals representing the lengths of "priority" messages awaiting transcription in said respective endless loop recorders to determine the expected delay in transcribing messages newly recorded therein.

24. The apparatus of claim 23 further including keyboard means manually operable for producing a command signal for controlling said display means to display the status of a predetermined ("priority") recorder and the status of recorders having messages for "priority transcription".

25. The apparatus of claim 24 wherein said command signal controls said display means to display further the status of recorders having messages designated as "priority" messages.

26. The apparatus of claim 24 wherein said message number means includes means for detecting the identifying number of a message positioned to be transcribed from the record medium at the dictate port of a recorder and providing said display means with information to display said identifying number.

27. The apparatus of claim 26 wherein said processor means additionally includes counting means for accumulating a count of the number of "priority" messages that await transcription from said transcribe port or dictate port of a recorder and providing said display means with information to display the accumulated count.

28. The apparatus of claim 27 wherein said processor means further includes length determining means for determining the overall length of said messages that await transcription on a "priority" basis from said dictate port or transcribe port of a recorder.

29. The apparatus of claim 13 wherein at least one of the recorders coupled to said signal control means comprises a changer-recorder having a supply of record media, means for transporting individual ones of said record media to a record station for recording messages thereon, and means for removing an individual record medium from said record station.

30. The apparatus of claim 29 wherein said record media comprise tape cartridges, each being transportable individually to said record station for recording at least one message thereon.

31. The apparatus of claim 30 wherein said changer-recorder includes settable means for establishing a preset overall tape length for recording messages, beyond which length the tape cartridge is removed from said record station at the completion of a message; wherein said signal control means includes means responsive to said settable means for providing a signal representing said preset length and means for providing a signal representing length of tape consumed by messages recorded on said tape cartridge; and wherein said processor means further includes means responsive to the last-mentioned signals for determining the portion of said preset length consumed by messages on said tape cartridge and for controlling said display means to display said portion.

32. The apparatus of claim 31 wherein said display means additionally displays a representation of said preset length established for said changer-recorder.

33. The apparatus of claim 30 wherein each said changer-recorder includes settable means for establishing a preset number of seizure connections thereto by said dictate stations, whereupon the tape cartridge is removed from said record station at the next release of a dictate station; wherein said signal control means includes means responsive to said settable means for providing a signal representing said preset number of seizure connections and means for providing a signal representing present number of seizure connections that have been made to said changer-recorder; and wherein said processor means further includes means responsive to the last-mentioned signals for controlling said display means to display alphanumeric characters representing said present and preset numbers of seizure connections.

34. The apparatus of claim 30 wherein each said changer-recorder includes settable means for establishing a preset time duration from an initial seizure thereof by a dictate station for recording on a tape cartridge until that tape cartridge is removed from said record station; wherein said signal control means includes means responsive to said settable means for providing a signal representing said preset time duration and means for providing a signal representing actual time duration from the initial seizure by a dictate station for recording on a tape cartridge; and wherein said processor means further includes means responsive to the last-mentioned signals for controlling said display means to display alphanumeric characters representing said preset and actual time durations.

35. The apparatus of claim 30 wherein each said changer-recorder includes means for identifying each tape cartridge transported to said record station; wherein said signal control means additionally provides signals representing identities of said tape cartridges; and wherein said processor means further includes means for controlling said display means to display said tape cartridge identities.

36. The apparatus of claim 15 wherein said processor means further includes means for producing a total length signal representing the sum of the length of messages in respective recorders awaiting transcription, means for producing a total rate signal representing the sum of the transcribe rates associated with the transcribe stations connected to said respective recorders, and means responsive to said total length and total rate signals to determine overall expected delay in transcribing newly recorded messages and provide said display means with information to display said overall delay.

37. The apparatus of claim 36 wherein said processor means includes means responsive to the signals representing the lengths of messages awaiting transcription in all of the recorders to determine the total length of messages awaiting transcription; and wherein said display means further displays said total length of messages awaiting transcription.

38. The apparatus of claim 36 wherein said processor means additionally includes counting means incremented when a message is recorded in a recorder to provide an accumulated count representing the total number of messages that await transcription in said respective recorders and means for controlling said display means to display the accumulated count.

39. In a central recording system having plural recorders for recording messages on record media therein, plural dictate stations for supplying messages to be recorded, means for connecting at least some of said dictate stations to said recorders, and monitoring means for monitoring the message recording activity of respective recorders, apparatus comprising indicating means for indicating to an operator the connection of an inactive dictate station to a recorder; operator initiated manually operable means for generating a disconnect command and for generating one of plural recorder identifying signals representing the particular recorder to which said inactive dictate station is connected; and means responsive to said disconnect command and to said recorder identifying signal for disconnecting the dictate station then connected to the identified recorder.

40. The apparatus of claim 39 wherein each recorder is connected to a dictate station by at least first and second conductors, at least one of said conductors normally having a first voltage level thereon when not in communication with a dictate station, said first voltage level being changed over to a second voltage level when a dictate station seizes said recorder for communication therewith; and wherein each dictate station includes switch means connected to one of said conductors and changed over from an inactive to an active condition when said dictate stations seizes said recorder, the active condition of said switch means changing over the voltage level on said one conductor from said first to said second voltage levels; and wherein said means for disconnecting the dictate station includes means for changing over the voltage level on said one conductor of the identified recorder from said second to said first voltage levels, and means at said dictate station responsive to the changing over of said voltage level for rendering said switch means inactive.

41. The apparatus of claim 40 wherein said means at said dictate station for rendering said switch means inactive includes bistate means set to a first state for rendering said switch means active when said dictate station seizes said recorder and set to a second state for rendering said switch means inactive when said voltage level on said one conductor is changed over from said second to said first voltage levels.

* * * * *

UNITED STATES PATENT AND TRADEMARK OFFICE
CERTIFICATE OF CORRECTION

PATENT NO. : 4,623,988
DATED : November 18, 1986
INVENTOR(S) : Robert T. Paulson et al.

It is certified that error appears in the above-identified patent and that said Letters Patent are hereby corrected as shown below:

Claim 1, column 28, line 32, delete "the" and insert --and--.

Claim 6, column 28, line 68, delete "at" and insert --the--.

Claim 6, column 29, line 3, delete "selected" and insert --selecting--.

Claim 8, column 29, line 12, change "conditions" to --condition--.

Claim 13, column 30, line 4, change "message" to --messages--.

Claim 23, column 32, line 6, delete "or" and insert --of--.

Claim 40, column 34, line 37, change "stations" to --station--.

Signed and Sealed this

Seventeenth Day of February, 1987

Attest:

DONALD J. QUIGG

Attesting Officer

Commissioner of Patents and Trademarks